(12) United States Patent
Chenard

(10) Patent No.: US 12,208,973 B2
(45) Date of Patent: *Jan. 28, 2025

(54) PELLET TRANSFER SYSTEM

(71) Applicant: Robert Joseph Chenard, Hay River (CA)

(72) Inventor: Robert Joseph Chenard, Hay River (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,342

(22) Filed: May 2, 2022

(65) Prior Publication Data

US 2022/0250858 A1 Aug. 11, 2022

Related U.S. Application Data

(63) Continuation of application No. 17/201,292, filed on Mar. 15, 2021, now Pat. No. 11,319,168, which is a continuation-in-part of application No. 16/608,670, filed as application No. PCT/CA2018/000078 on Apr. 25, 2018, now Pat. No. 10,947,065.

(60) Provisional application No. 62/491,642, filed on Apr. 28, 2017.

(30) Foreign Application Priority Data

Sep. 30, 2020 (CA) ...................... 3094861

(51) Int. Cl.
*B65G 53/24* (2006.01)
*B60P 3/00* (2006.01)
*B65G 53/46* (2006.01)
*F23K 3/02* (2006.01)

(52) U.S. Cl.
CPC ............. *B65G 53/24* (2013.01); *B60P 3/00* (2013.01); *B65G 53/46* (2013.01); *F23K 3/02* (2013.01)

(58) Field of Classification Search
None
See application file for complete search history.

(56) References Cited

U.S. PATENT DOCUMENTS

| | | |
|---|---|---|
| 2,333,316 A | 11/1943 | Klossner |
| 3,462,538 A | 8/1969 | Pellegrini et al. |
| RE27,471 E | 8/1972 | Mundinger |
| 3,822,919 A | 7/1974 | Strom |
| 3,861,753 A | 1/1975 | Lesk et al. |
| 4,127,397 A | 11/1978 | O'Nan, Jr. et al. |
| 4,202,076 A | 5/1980 | Rancatore |

(Continued)

OTHER PUBLICATIONS

International Search Report issued by the Canadian Intellectual Property Office on Jul. 5, 2018 in connection with corresponding International PCT Patent Application No. PCT/CA2018/000078, 3 pages.

(Continued)

*Primary Examiner* — Joseph A Dillon, Jr.

(57) ABSTRACT

Disclosed is a system for transferring fuel pellets from one container which may be at a location external to a building to a second container which may be at a location in an interior of the building. The system may include a first container positioned at a location remote from the building and a second container positioned proximate to the building. The first and second containers are connected to one another to permit the transfer of fuel pellets from the first container to the second container by a pneumatic apparatus.

23 Claims, 12 Drawing Sheets

(56) References Cited

U.S. PATENT DOCUMENTS

| | | | |
|---|---|---|---|
| 4,278,163 A | 7/1981 | Tomich | |
| 4,278,240 A | 7/1981 | Archenholtz | |
| 4,394,259 A | 7/1983 | Benny et al. | |
| 4,407,315 A | 10/1983 | Haberer | |
| 4,779,544 A | 10/1988 | Stevens | |
| 4,973,203 A | 11/1990 | Oftedal | |
| 4,984,610 A | 1/1991 | Eckert | |
| 4,988,240 A | 1/1991 | Thompson | |
| 5,006,019 A | 4/1991 | Dziedzic, Jr. et al. | |
| 5,083,704 A * | 1/1992 | Rounthwaite | B65F 5/005 43/64 |
| 5,151,000 A | 9/1992 | Geraghty et al. | |
| 5,341,856 A | 8/1994 | Appenzeller | |
| 5,593,067 A | 1/1997 | Shaw et al. | |
| 5,996,852 A | 12/1999 | Johnson | |
| 6,136,064 A | 10/2000 | Newcomb | |
| 6,213,139 B1 * | 4/2001 | Rogers | E03F 7/10 137/565.17 |
| 6,325,572 B1 * | 12/2001 | Dietrich | B65G 53/24 406/146 |
| 6,379,086 B1 | 4/2002 | Goth | |
| 6,588,988 B2 | 7/2003 | Zlotos | |
| 6,979,152 B2 | 12/2005 | Bodie et al. | |
| 7,228,990 B2 | 6/2007 | Schmidt | |
| 7,641,103 B1 | 1/2010 | Tomich | |
| 7,886,402 B2 | 2/2011 | Kihlstrom | |
| 8,113,745 B2 | 2/2012 | Aoki | |
| 8,322,951 B2 * | 12/2012 | Kvalheim | B65G 53/40 406/114 |
| 8,801,930 B2 | 8/2014 | Qiu | |
| 9,689,610 B2 | 6/2017 | Motomura et al. | |
| 9,708,138 B2 * | 7/2017 | Veselov | B65G 53/46 |
| 9,731,914 B2 * | 8/2017 | Rasner | B65G 53/66 |
| 9,758,319 B2 | 9/2017 | Celella | |
| 10,106,338 B2 | 10/2018 | Douglas | |
| 10,619,927 B2 | 4/2020 | Pilote et al. | |
| 10,696,475 B2 | 6/2020 | Herman et al. | |
| 11,066,255 B2 * | 7/2021 | Kramer | B65G 53/40 |
| 11,472,637 B1 * | 10/2022 | Reising | B65G 53/52 |
| 2005/0126454 A1 * | 6/2005 | Steffl | F23J 1/02 110/235 |
| 2008/0035675 A1 | 2/2008 | Norman | |
| 2008/0283142 A1 * | 11/2008 | Steffl | F23K 3/02 141/2 |
| 2009/0010719 A1 * | 1/2009 | Morris | B65G 53/24 406/197 |
| 2010/0226738 A1 | 9/2010 | Strimling et al. | |
| 2011/0061738 A1 | 3/2011 | Strimling et al. | |
| 2012/0107059 A1 * | 5/2012 | Howland | B65G 53/24 406/84 |
| 2012/0177451 A1 | 7/2012 | Kvalheim | |
| 2014/0255133 A1 | 9/2014 | Wilkinson et al. | |
| 2015/0059140 A1 | 3/2015 | Lin et al. | |
| 2015/0344242 A1 | 12/2015 | Celella | |
| 2016/0280473 A1 * | 9/2016 | Veselov | B65G 53/66 |
| 2016/0368719 A1 | 12/2016 | Hecht | |
| 2018/0202012 A1 | 7/2018 | Kashakashvili et al. | |
| 2019/0100391 A1 | 4/2019 | Managan | |
| 2019/0255794 A1 * | 8/2019 | Bishop | B23Q 11/005 |

OTHER PUBLICATIONS

Written Opinion of the International Searching Authority issued by the Canadian Intellectual Property Office on Jul. 5, 2018 in connection with corresponding International PCT Patent Application No. PCT/CA2018/000078, 5 pages.

Online Review by Chris—PelHeat: http://www.pelheat.com/wood_pellet_vacuum.html, Aug. 28, 2015, 3 pages.

Optimum Heat (Southern) Ltd., "Optimum iQ 3.0 System Features", http://www.optimumheat.co.uk/index_htm_files/Optimum-iQ-3.0-V1.1.pdf, at least as early as Feb. 21, 2017, 12 pages.

Energex American, Inc. and Energex Pellet Fuel, Inc., http://www.energex.com/BulkFuel.php, at least as early as Feb. 21, 2017, 2 pages.

Pellergy, LLC, "Bulk Wood Pellet Handling and Transfer", http://www.pellergy.com/bulk-wood-pellet-handling-and-transfer/, © 2015 Pellergy, LLC, 4 pages.

"Woodpecker Wood Pellet Vacuum System", Video available online at: https://www.youtube.com/watch?v=gtfZrFCZ2rU, Jun. 12, 2010.

"Energex Introduces PelletsExpress!", Video available online at: https://www.youtube.com/watch?v=1U_R3x28oU, Dec. 6, 2012.

"920 Pound Pellet Bulk Bin Transfer System", Video available online at: https://www.youtube.com/watch?v=Ek3xa9MiShc, Mar. 1, 2015.

* cited by examiner

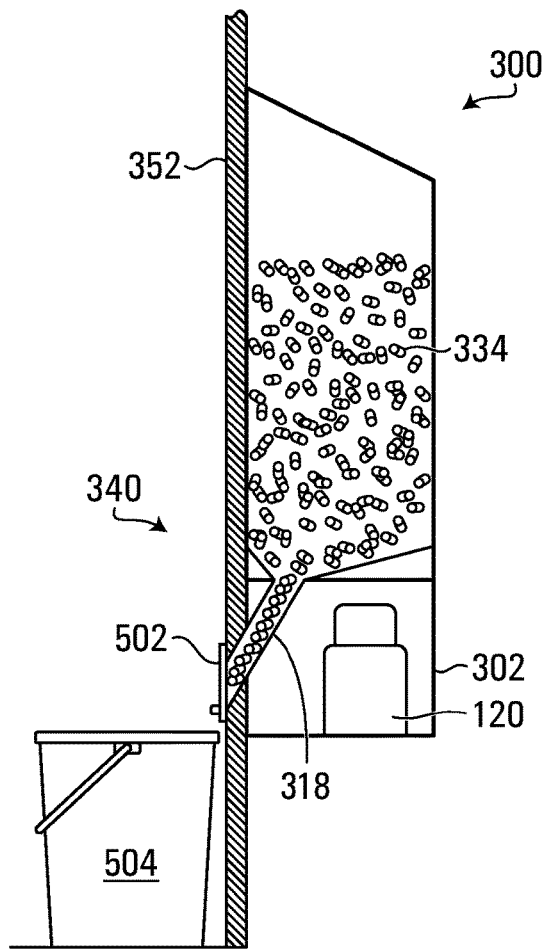 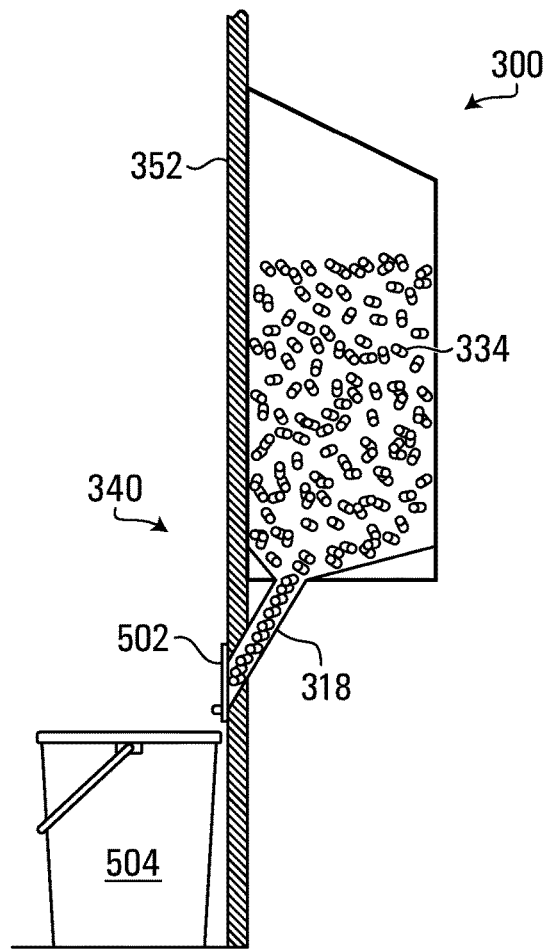
FIG. 3A    FIG. 3B

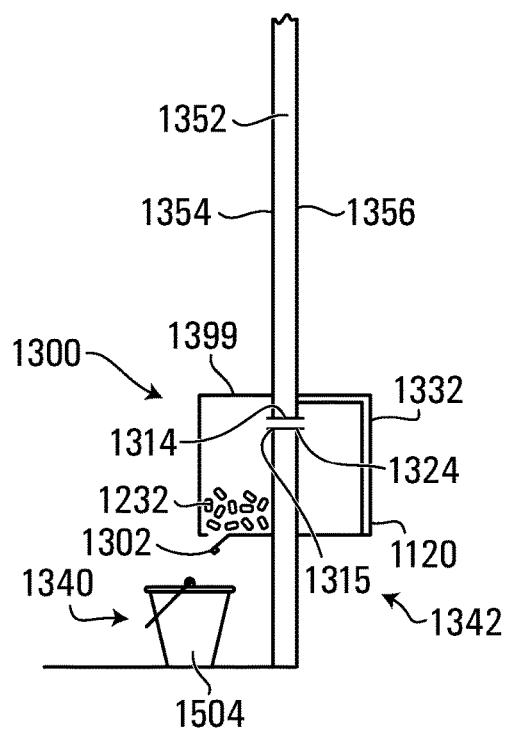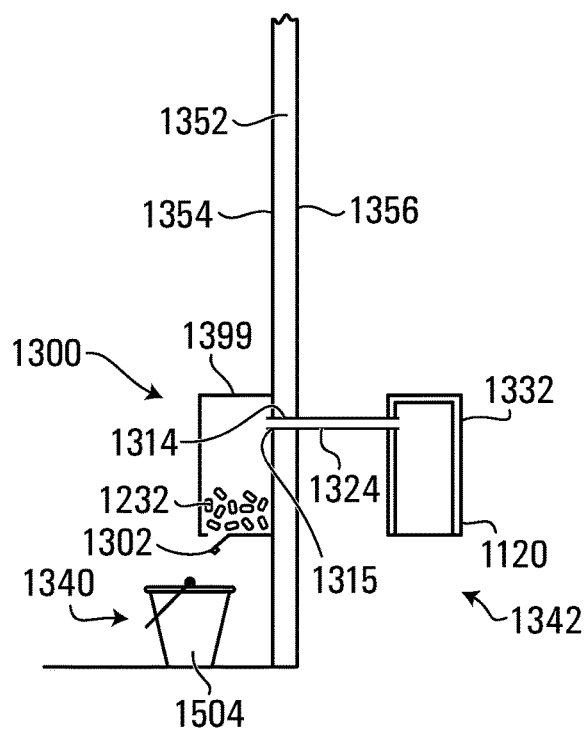
FIG. 8A　　　　FIG. 8B

PELLET TRANSFER SYSTEM

CROSS-REFERENCE TO RELATED APPLICATIONS

This application is a Continuation of U.S. patent application Ser. No. 17/201,292 filed on Mar. 15, 2021, which is a Continuation-in-part of U.S. patent application Ser. No. 16/608,670 filed on Oct. 25, 2019 (now U.S. Pat. No. 10,947,065 issued on Mar. 16, 2021), which is a National Phase Entry of international PCT Patent Application Serial No. PCT/CA2018/000078 filed on Apr. 25, 2018, designating the United States, and which claims the benefit of, and priority from U.S. Provisional Patent Application Ser. No. 62/491,642 filed on Apr. 28, 2017. This application also claims the foreign priority benefit of Canadian Patent Application Serial No. 3,094,861 filed on Sep. 30, 2020. The contents of each of the aforementioned applications are incorporated by reference herein.

FIELD

The present disclosure relates to pellet transfer systems and methods, and in particular to systems and methods for transferring pellets, such as fuel pellets, to a location outside of a building to a location in an interior of a building.

BACKGROUND

Fuel pellets are pellets that can be used as a source of fuel in a combustion apparatus such as for example a stove or burner. Fuel pellets include biofuel pellets that may be made from compressed organic matter or biomass. Wood pellets are another common type of fuel pellets and are generally made from compacted sawdust and related wastes from the milling of lumber, manufacture of wood products and furniture, and construction. Wood pellets and other fuel pellets may be suitable for use in home and other buildings, and may be used as a source of energy when combusted, providing heat energy for heating the buildings. Accordingly, some homes and other buildings are equipped with fuel pellet burners. Some homes and other buildings rely on fuel pellets as a back-up source of fuel/energy, while others rely on fuel pellets primarily or exclusively as the source of fuel. For example, in remote geographical regions of the world, such as in Canadian rural areas, fuel pellets may be the primary source fuel for heating.

Fuel pellets may be sold to the average consumer in bags, such as 40 pound bags. Such bags can usually be handled by a single individual who can transport such bags from one location such as a storage location (which may be detached from a building) to another location where they can be unpacked and the fuel pellets used to feed a fuel pellet burner. This substantially manual system/method of moving fuel pellets from a storage location to a location where they can be fed into a burner is cheap and easy to employ for small scale uses of fuel pellets (e.g. for feeding a back-up heater in case of power outage, or feeding a stove in a seldom used cottage).

However, for homes and buildings that rely on the use of large amounts of fuel pellets, simply utilizing and moving bags that hold a relatively modest number/weight of fuel pellets to provide the necessary amount of fuel pellets for burners can be inconvenient. For example, a typical home relying solely on fuel pellets to provide heating from a burner may consume in the order of one or more tons of fuel pellets each year. Similarly, a large building, such as for example a hockey rink industrial warehouse/factory may consume in the order of tens of tons of fuel pellets each year. Such homes and buildings may utilize a storage container (e.g. a silo) having a large storage capacity and which may be located some distance from the building that contains the stove/burner. The large storage container can typically hold several weeks or even months' supply of pellets at a time. Such storage silos are typically replenished by large orders of pellets that are delivered by a transportation apparatus, such as truck. However, external storage silos may be inconvenient to reach and/or difficult to access when it is desired to draw fuel pellets from the storage silo, such as in cold winter months.

Storage silos are often positioned at a significant distance the home or building that relies on the fuel pellets to accommodate deliveries by a truck. It may be advantageous to place the storage silos a significant distance from the home of building to reduce noise and dust resulting from the truck deliveries that may negatively impact individuals in close proximity to the storage silo. Also, locating a storage silo at a significant distance from the home/building may reduce the fire risk posed by the storage of a large volume of fuel pellets. However, external storage silos may be inconvenient to reach and difficult to access when it is desired to draw fuel pellets form the storage silo, such as in cold winter months.

Accordingly, alternate systems and methods are desired for transferring fuel pellets from a storage location external to and remote from a building to a location in/proximal to an interior of a building.

SUMMARY

In overview, a system is disclosed for transferring fuel pellets, such as wood pellets, from a location remote/external to a building to a location within the interior of the building. The system may include two fuel pellet containers. A first container may be positioned at a location remote/a significant distance from the building and may be suitable for receiving and storing a relatively large volume of fuel pellets. This first container may be configured and suitably located to be able to receive and hold a large volume of fuel pellets from a delivery apparatus such as a truck.

A second container may be positioned close to/proximate/adjacent to an exterior portion of the building and may be suitable for receiving and storing a relatively smaller volume of fuel pellets than the first container. The first container and the second container may be in fuel pellet communication with one another. For example, a conduit may connect the first and second containers to permit the movement of fuel pellets from the first container to the second container. In addition, the second container may be in fuel pellet communication with a location within the interior of the building. For example, another conduit may extend from the second container located proximate/adjacent the exterior of the building, through a wall of the building, into the interior of the building.

The system may also include an apparatus that is operable to create an air pressure differential between the first container and the second container, such that the air pressure within the second container is substantially less than the air pressure in the first container. Accordingly, the air pressure within the second container may be substantially less than atmospheric air pressure when pneumatic apparatus is operational. The air pressure within the second container may return to atmospheric air pressure after pneumatic apparatus is switched off.

For example, a pneumatic apparatus, such as a vacuum generator, may be connected to and in air communication with the second container. When the pneumatic apparatus is operated, it may lower the air pressure within an inner cavity of the second container substantially below the air pressure in the ambient surroundings, and in particular below the air pressure within a cavity in the first container. This pressure difference may create an air flow from the interior of the first container through the connecting conduit to the second container. The air flow that is generated will be of sufficient velocity to create forces acting upon fuel pellets in the first container to cause the fuel pellets in the first container to move from the first container through the conduit into the second container.

Thus, the pneumatic apparatus may create an air flow which moves fuel pellets from the first container, which is remote from the building, to the second container, which is proximate to/adjacent to the exterior of the building. The pneumatic apparatus may be operated selectively and intermittently to load the second container with fuel pellets from the first container when desired.

The second container may be generally enclosed and may have a substantially sealed inner cavity that permits the pneumatic apparatus to reduce air pressure in the second container sufficiently to cause the fuel pellets held in the first container to be transferred from the first container through the connecting conduit into the second container.

Further, because the second container may also be in fuel pellet communication with the interior of the building, the fuel pellets in the second container may be easily transferred into the interior of the building when fuel pellets are required in the interior of the building.

A conduit may be connected at a bottom portion/region of the second container and may extend downwardly through a wall of the building into the interior of the building. This may allow the fuel pellets to flow into the building from the second container due to the force of gravity, without the use of a pneumatic apparatus or other driving apparatus. The fuel pellets may be received in the interior of the building and intermittently and selectively flow into a third container which may be manually movable by an individual, e.g. a bucket. The third container may be movable to allow the operator to move the fuel pellets from the outlet of the conduit from the second container, to the desired location in the building, e.g. to a stove or a furnace for use.

A valve mechanism such as a sliding trapdoor/gate may be mounted in a position to operably control the flow of fuel pellets through the conduit into the interior of the building. For example, a sliding trapdoor may be provided at the outlet of the conduit which extends from the second container into the interior of the building. The trapdoor may be manually movable between an open position and a closed position. When in the open position, fuel pellets from the second container can be transferred into the interior of the building; i.e. the fuel pellets may flow into the interior of the building due to gravity. When in the closed position, fuel pellets from the second container are blocked by the trapdoor. Accordingly, in use, the operator will open the trapdoor to receive fuel pellets as needed, and will close the trapdoor to seal the opening of the conduit from the second container. The system therefore provides to the operator pellets when the trapdoor is in the open position.

This arrangement means that the pneumatic apparatus only has to be operated intermittently. Fuel pellets from the second container, which flow from the second container into the interior of the building due to gravity, may be used on a relatively frequent basis (e.g. a day-to-day basis) until the second container is close to empty or is empty. Once the second container is empty (or near empty), the operator may then decide to turn on the pneumatic apparatus to move an additional batch of fuel pellets from the first container into the second container. Depending upon the relative height positioning of the inlet to the second container compared to the outlet from the first container, the pneumatic apparatus may have to generate sufficient air flow between the first container and the second container to overcome not only physical/frictional resistive forces resisting movement of the fuel pellets, but also gravitational forces.

This system allows an operator to access fuel pellets from within the interior of the building without the need to activate the pneumatic apparatus on a relatively frequent basis. While the pneumatic apparatus may be activated by a simple switch mounted in the interior of the building, by relying on gravity for fuel pellets on a day-to-day basis, the operator does not have to wait until the pneumatic apparatus has transferred fuel pellets each day. Further, the pneumatic apparatus may be powered using electrical power, which may not be available at all times (especially in remote regions) such as when an electrical generator is not operating.

According to one illustrative embodiment, there is provided a system for transferring a plurality of fuel pellets comprising a first container positioned at a location remote from a building and configured to hold a first volume of a plurality of fuel pellets; an enclosed second container positioned proximate an exterior portion of the building and configured to hold a second volume of a plurality of fuel pellets, the second container being in fuel pellet communication with the first container to permit the transfer of fuel pellets from the first container to the second container, and the second container also being in fuel pellet communication with a location in an interior of the building to permit the transfer of fuel pellets from the second container to the interior of the building; and an apparatus operable for generating an air pressure differential between the first container and the second container, such that the air pressure within the second container is substantially less than the air pressure in the first container and sufficient to cause fuel pellets held in the first container to be communicated from the first container to the second container.

According to another illustrative embodiment, there is provided a method for transferring a plurality of fuel pellets comprising holding in a first container a first volume of a plurality of fuel pellets, the first container being positioned at a location remote from a building and being in fuel pellet communication with an enclosed second container to permit the transfer of fuel pellets from the first container to the second container, and the second container being positioned proximate an exterior portion of the building; and selectively operating a pneumatic apparatus to generate an air pressure differential between the first container and the second container, such that the air pressure within the second container is substantially less than the air pressure in the first container and sufficient to cause fuel pellets held in the first container to be communicated from the first container to the second container, thereby transferring fuel pellets to the second container.

Accordingly, an aspect of the present disclosure relates to a system for transferring a plurality of fuel pellets from a location external to a building, through an exterior wall of the building, to a location within the building. The system includes a first container positioned at a location external to the building and configured to hold a first volume of a plurality of fuel pellets in a first inner cavity. The system also includes a second enclosed container positioned at a location in an interior of the building and configured to hold a second volume of a plurality of fuel pellets in a second inner cavity. The system also includes a first conduit providing fuel pellet communication from an inner cavity of the first container via the first conduit to the inner cavity of the second container to enable the transfer of fuel pellets from the first container to the second container. The system also includes a pneumatic apparatus positioned at a location external of the building. The system also includes a second conduit extending from the second container the through the exterior wall of the building to the pneumatic apparatus and providing air flow communication from the second inner cavity through the second conduit. The pneumatic apparatus being operable for selectively generating an air pressure differential between the first inner cavity and the second inner cavity, such that when operated, a first air pressure within the second inner cavity is less than a second air pressure in the first inner cavity. The air pressure differential developed by the pneumatic apparatus by air flow though the second conduit being sufficient to cause fuel pellets held in the first container to be communicated with air flow from the first container through the first conduit to the second container.

In another aspect, there is provided a method for transferring a plurality of fuel pellets. The method includes holding in a first container a first volume of a plurality of fuel pellets, the first container being positioned at a location external of a building and being in fuel pellet communication with an enclosed second container, the second container positioned in a location in an interior of the building, the first container and second container operable to permit the transfer of fuel pellets from the first container through a first conduit to the second container, and the second container being positioned proximate a location external of the building. The method also includes selectively operating a pneumatic apparatus, the apparatus positioned at a location on the exterior of the building and interconnected for air flow transmission by a second conduit to the second container, to generate an air pressure differential between the first container and the second container, such that the air pressure within the second container is substantially less than the air pressure in the first container and sufficient to cause fuel pellets held in the first container to be communicated from the first container to the second container, thereby transferring fuel pellets to the second container.

In another aspect, there is provided a method for transferring a plurality of fuel pellets from a first container to a second container with a system including a first container positioned at a location external to the building and configured to hold a first volume of a plurality of fuel pellets in a first inner cavity. The system also includes a second enclosed container positioned at a location in an interior of the building and configured to hold a second volume of a plurality of fuel pellets in a second inner cavity. The system also includes a first conduct providing fuel pellet communication from an inner cavity of the first container via the first conduit to the inner cavity of the second container to enable the transfer of fuel pellets from the first container to the second container. The system also includes a pneumatic apparatus positioned at a location external of the building. The system also includes a second conduit extending from the second container the through the exterior wall of the building to the pneumatic apparatus and providing air flow communication from the second inner cavity through the second conduit. The method includes activating the pneumatic apparatus to generate an air pressure differential between the first inner cavity and the second inner cavity, such that a first air pressure within the second inner cavity is less than a second air pressure in the first inner cavity, the air pressure differential developed by the pneumatic apparatus by air flow though the second conduit, is sufficient to cause fuel pellets held in the first container to be communicated with air flow from the first container through the first conduit to the second container.

BRIEF DESCRIPTION OF THE DRAWINGS

In the figures which illustrate example embodiments,

FIGS. 3A-3B show a partial schematic view of the pellet transfer system of FIG. 1, in accordance with various embodiments;

FIGS. 8A-8B show partial schematic views of some of the components depicted in FIG. 6, in accordance with various embodiments;

DETAILED DESCRIPTION

Figure 1:
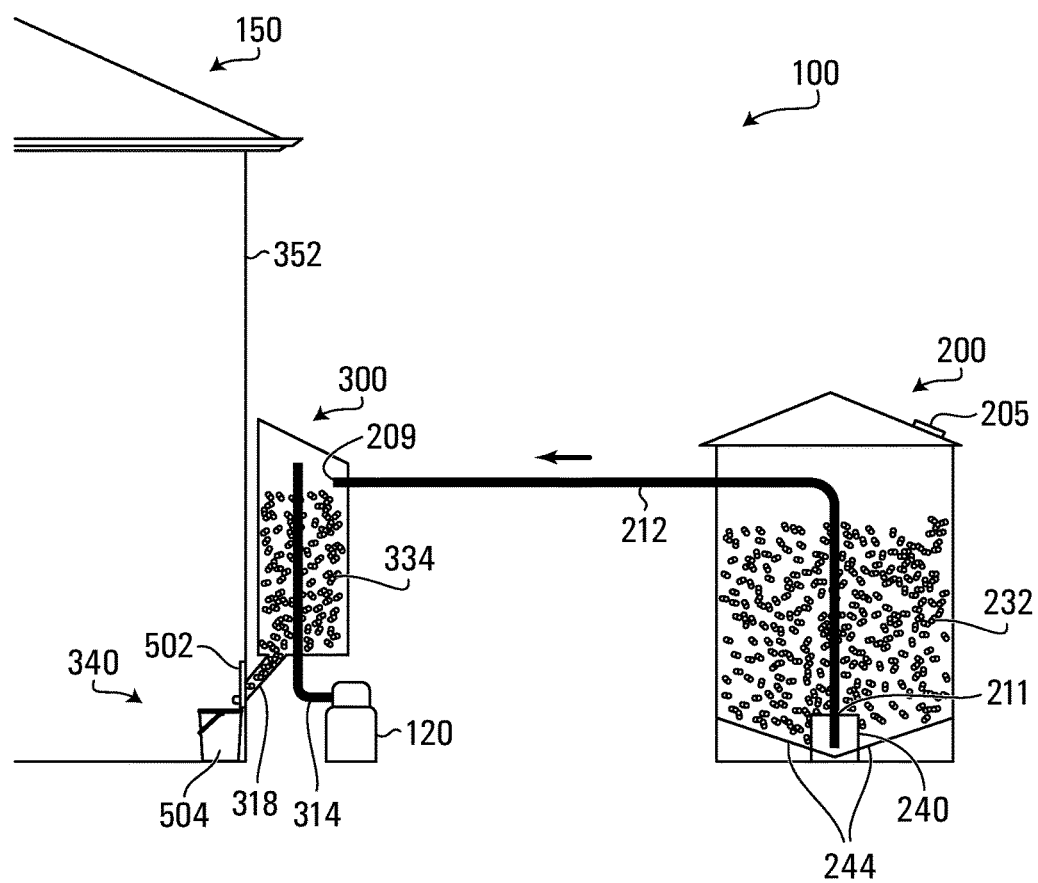
FIG. 1 shows a schematic view of a pellet transfer system in accordance with one embodiment.

With reference to FIG. 1, a schematic view of system 100 for transferring/moving fuel pellets is illustrated that may include a first container 200, a second container 300, and a pneumatic apparatus 120. Second container 300 may be located proximate/adjacent to an exterior wall 352 of a building 150 having an interior 340. First container 200 may be positioned at a location remote from second container 300 and building 150. For example, first container 200 and second container 300 may be positioned apart from each other at an approximate distance in the range of about 10 (or less) feet to 70 (or more) feet.

First container 200 may have a housing that defines an inner cavity that may hold a first volume of fuel pellets 232. The housing defining the cavity of first container 200 may be made of one or more strong, durable, air permeable and non-water permeable, materials. For example the housing of container 200 may be made of wood, rigid plastic, or metal. In some embodiments, the one or more materials forming first container 200 may be non-air permeable materials, but first container 200 may otherwise have openings that allow air to flow into first container 200, such as from the environment, in order to create the required air flows described herein.

The housing of first container 200 may be a multi-layer construction and may include an outer layer and an inner layer providing a surface that defines the wall of the inner cavity. Both inner and outer layers may be made of materials that are plyometric, wooden, or metallic.

First container 200 may have an opening 205 with a hinged door that may be selectively opened and closed. When the door is in an open configuration this may allow the transfer of fuel pellets from a delivery apparatus (e.g. a truck) into the inner cavity using a conventional system such as a pneumatic system for transferring pellets from the delivery apparatus to first container 200.

Second container 300 may also be generally enclosed and may be positioned proximate/adjacent to building 150. Second container 300 may have a housing that defines an inner cavity that may hold a second volume of fuel pellets 334. The housing defining the cavity of second container 300 may be made of one or more strong, durable, non-air and non-water permeable materials. For example the housing of container 300 may be made of wood, rigid plastic, metal.

The housing of second container 300 may be a multi-layer construction and may include an outer layer and an inner layer providing a surface that defines the wall of the inner cavity. Both inner and outer layers may be made of materials that are plyometric, wooden, or metallic.

Also, as shown in FIG. 1, pneumatic apparatus 120 may also be positioned proximate/adjacent to building 150 and proximate/adjacent to second container 300.

Also shown in FIG. 1 are a first conduit 212, that may fluidly connect first and second containers 200, 300; a second conduit 314, that may fluidly connect second container 200 and pneumatic apparatus 120; and a third conduit 318, that may fluidly connect second container 300 and interior 340 of building 150 through exterior wall 352. In the interior 340 of building 150 is an opening 524, which may have a valve mechanism such as a sliding trapdoor/gate 502 (best shown in FIGS. 5A-5B). In proximity to opening 524 may be a placed a third container 504 for receiving fuel pellets that flow through trapdoor 502 when it is an open operational configuration.

Accordingly, second container 300 is in fuel pellet communication with first container 200, through first conduit 212, to permit the transfer of fuel pellets from first container 200 to second container 300. Similarly, second container 300 is also in fuel pellet communication with a location interior 340 of building 150, through third conduit 318, to permit the transfer of fuel pellets from second container 300 to interior 340.

Figure 2A:
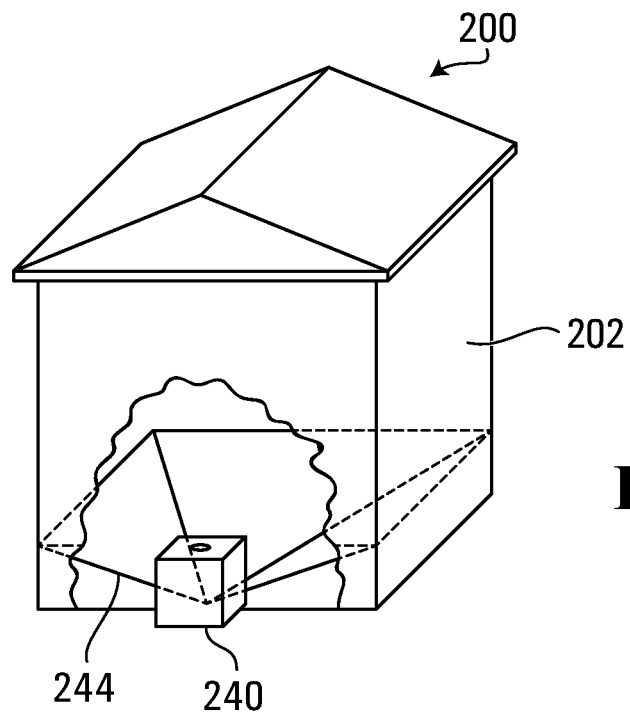
FIG. 2A shows a cut away perspective isolated view of a first container of the pellet transfer system of FIG. 1, in accordance with one embodiment.

Reference is now made to FIG. 2A illustrating an example embodiment of first container 200 in a perspective isolated view. As shown, first container 200 may have a cone-shaped/sloped bottom surface 244 in part defining inner cavity 202. Conically shaped/sloped bottom surface 244 may be provided with a bottom vertex at the base of first container 200. Fuel pellets 232 held in cavity 202 of first container 200 may, at least in part, be forced by gravity towards the vertex of bottom surface 244. At the bottom vertex of surface 244 may be connected a flow regulator 240, which may be in fuel pellet and air flow communication with first container 200 to permit and regulate the transfer of fuel pellets 232 from bottom portion 244 of first container 200 to flow regulator 240 and into conduit 212. Fuel pellets 232 in the vicinity of bottom surface portion 244 may move into flow regulator 240 at least in part by gravity.

Figure 2B:
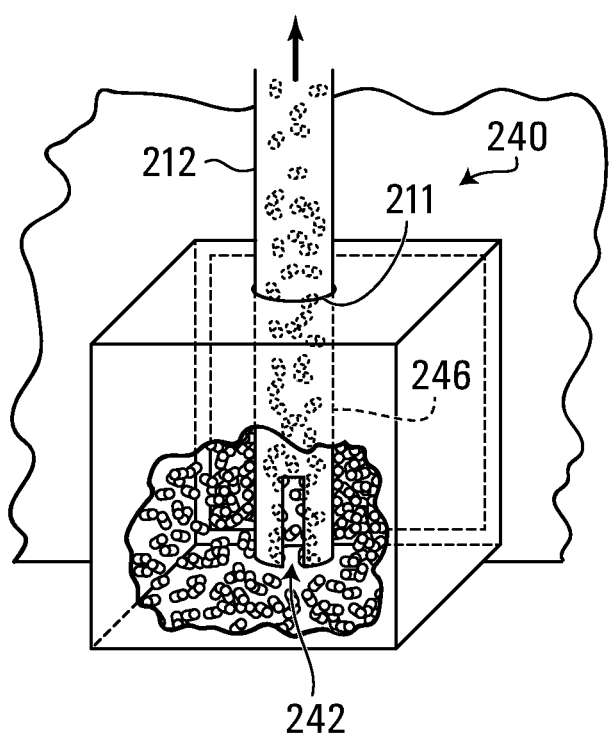
FIG. 2B shows a cut away perspective isolated view of a flow regulator of the pellet transfer system of FIG. 1, in accordance with one embodiment.

Shown in FIG. 2B is a close-up perspective view of flow regulator 240. Flow regulator 240 may have an upwardly extending conduit 246 with a lower cut-out inlet portion 242. Conduit 246 may be air flow and fuel pellet connected at an upper end thereof to an inlet 211 of first conduit 212. Conduit 246 may also be raised from the floor of flow regulator 240 by approximately 1 to 1.5 inches. The gap between the bottom of conduit 246 and floor of flow regulator 240 may permit fuel pellets and air to enter conduit 246.

When pneumatic apparatus 120 is activated, air may flow from cavity 202 of container 200 and into flow regulator 240 due to a pressure differential between first container 200 and second container 300. Fuel pellets in flow regulator 240 may then be drawn by the air flow generated, through the gap between the bottom of conduit 246 and floor of flow regulator 240, into conduit 246, then into first conduit 212, and finally into second container 300.

Lower cut-out inlet portion 242 may also permit additional air to flow from flow regulator 240 to second container 300 (through conduits 246 and 212) when pneumatic apparatus 120 is activated. Lower cut-out inlet portion 242 may help ensure that fuel pellets held in first container 200 are communicated through first conduit 212 in combination with an air flow to second container 300. This may reduce the likelihood that first conduit 212 will become clogged by word pellets during operation of pneumatic apparatus 120.

Further, as fuel pellets may be communicated in combination with an air flow which passes through cut-out portion 242 of flow regulator 240, flow regulator 240 may reduce/control the number of fuel pellets that can enter first conduit 212; further reducing the likelihood that first conduit 212 will become clogged.

Cut-out inlet portion 242 may be rectangular shaped having an approximate length of 2 to 4 inches and an approximate width of 0.5 to 1.5 inches. However, cut-out inlet portion 242 may be of any of any shape and size so long as it allows sufficient air to flow from flow regulator 240 to second container 300. Further, multiple cut-out inlet portions may be provided.

In some embodiments, the ratio of fuel pellets and air flow in the mixture flowing through conduit 212 may be selectively controlled and varied by adjusting the size of an open portion of cut-out inlet portion 242. Cut-out inlet portion 242 may have attached thereto a mechanism for selectively adjusting the size (e.g. length and/or width) of the open portion of cut-out inlet portion 242, such as a sliding door, which may be selectively positioned to vary the open portion of cut-out inlet portion 242. By adjusting the length and/or width of the open portion of cut-out inlet portion 242, an operator may easily vary the amount of air which is permitted to flow though from cavity 202 of container 200, through cut-out inlet portion 242 into first conduit 212. The more air that flows through cut-out inlet portion 242 into first conduit 212, the fewer fuel pellets will pass.

Figure 2C:
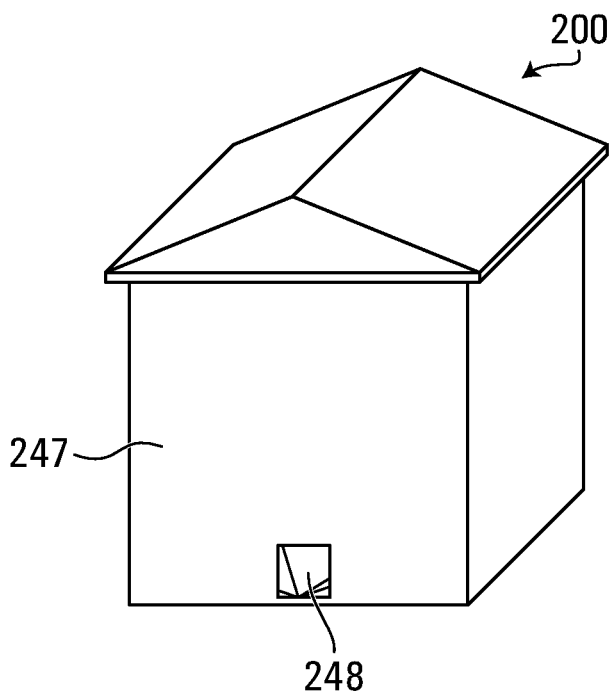
FIGS. 2C-2D show in perspective isolated view of a first container of the pellet transfer system of FIG. 1, in accordance with one embodiment.
Figure 2D:
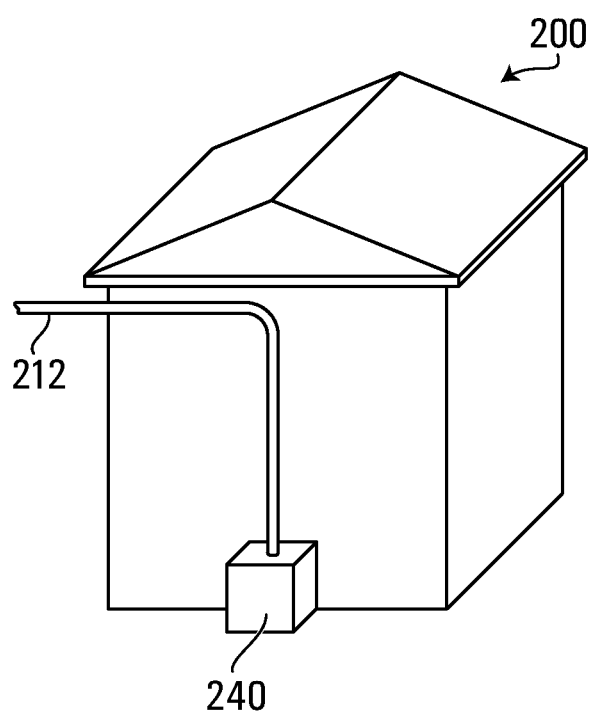

Reference is now made to FIGS. 2C and 2D, which illustrate in perspective view the exterior of an example first container 200. As shown, first container 200 may include a lower opening 248 in exterior wall 247 of first container 200 (FIG. 2C). Opening 248 may be air flow connected to the vertex of bottom surface portion 244 of container 200 and receive fuel pellets 242 from bottom portion 244 due in part to gravity. As shown in FIG. 2D, flow regulator 240 may be mounted to exterior wall 247 of container 200 and engage and be in communication with opening 248. As shown, flow regulator 240 may be attached on an exterior side of first container 200 to provide ease of access to flow regulator 240 for added convenience during operation, maintenance, and repairs. For example, an operator may access flow regulator 240 to adjust the size of an open portion of cut-out inlet portion 242.

Reference is now made to FIGS. 3A and 3B where example embodiments of enclosed second container 300 are shown. Notably, shown in FIGS. 3A and 3B are schematic views of third conduit 318 connecting second container 300 and opening 524 in interior 340 of building 150 through exterior wall 352 to place second container 300 in fuel pellet communication with the interior 340 of building 150 to facilitate the movement of fuel pellets from second container 300 to the interior of building 150.

Third conduit 318 may extend downwardly from a bottom portion of second container 300, through exterior wall 352 of building 150, and terminate at an opening 524 at the interior side of exterior wall 352. In some embodiments, third conduit 318 extends from the base wall of second container 300 downwardly at a 30-45 degree angle from the horizontal, through exterior wall 352, thereby enhancing the effect of gravity, and reducing the number of fuel pellets that remain stuck in second container 300. In an embodiment as shown in FIG. 3B, the angle is a 45 degree angle.

Figure 5A:
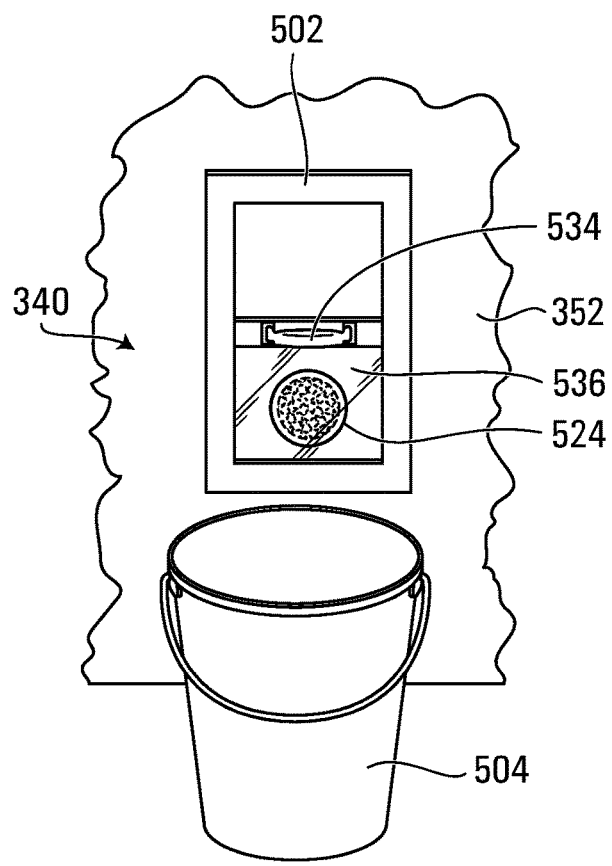
FIGS. 5A-5B show a partial perspective view of the pellet transfer system of FIG. 1, in accordance with one embodiment.
Figure 5B:
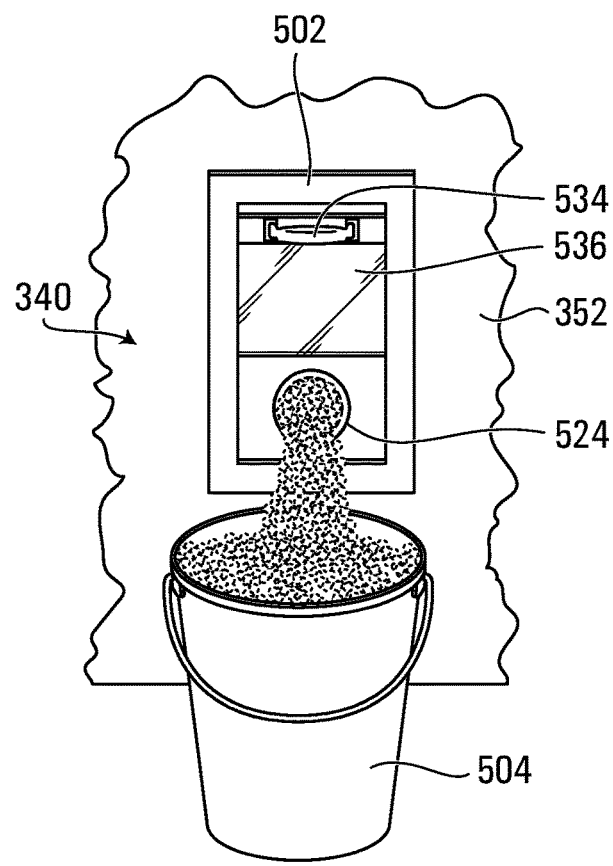

As shown in FIGS. 5A and 5B, a valve mechanism such as trapdoor 502 may selectively seal and unseal opening 524 such that when trapdoor 502 is in the open position, fuel pellets from second container 300 flow out of opening 524 due to gravity into third container 504 (FIG. 5B). Trapdoor 502 may also provide an air seal when in the closed position.

Trapdoor 502 will assist in sealing the interior cavity of container 300 such that any air flow generated within the interior cavity will flow from conduit 212 and into the pneumatic apparatus 120, thus increasing the efficiency of the pneumatic apparatus in creating the desired low air pressure in the cavity of second container 300 and the consequent air flow through conduit 212 from first container 200.

Figure 4A:
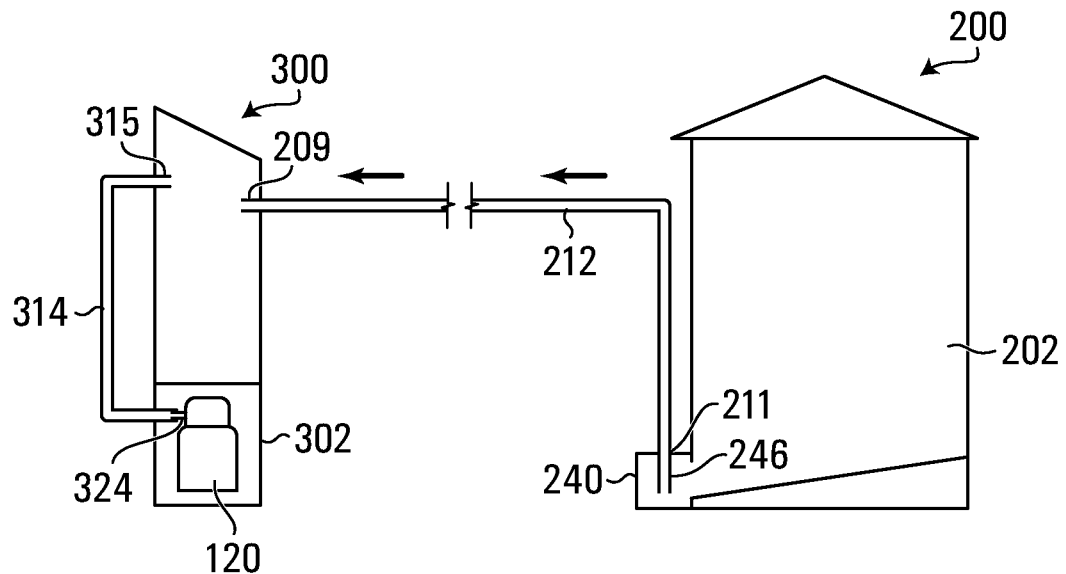
FIGS. 4A-4B show a partial schematic view of the pellet transfer system of FIG. 1, in accordance with various embodiments.

As shown in FIG. 3A and FIG. 4A, second container 300 may be an enclosed container mounted to external wall 352 of building 150 and pneumatic apparatus 120 may be located in a bottom cavity portion 302 of second container 300 (also mounted to external wall 352). This is convenient place to store pneumatic apparatus 120 for several reasons. First, pneumatic apparatus 120 can be placed in close proximity to second container 300, thereby increasing its effectiveness at transporting fuel pellets. Further, the second container 300 can easily be extended to store pneumatic apparatus 120, thereby reducing the need for an additional storage container.

Figure 4B:
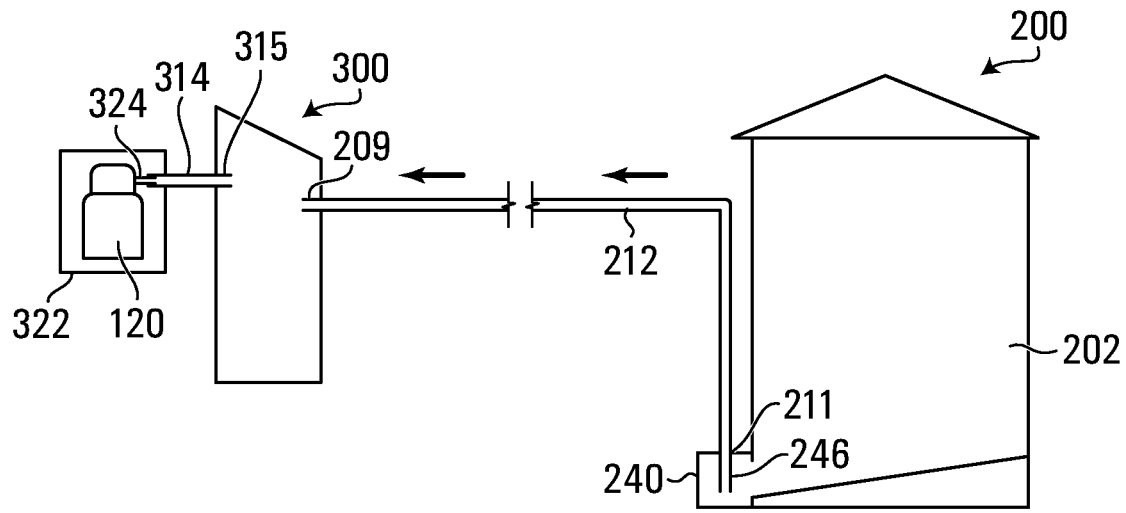

However, as shown in FIGS. 3B and 4B, pneumatic apparatus 120 may be stored in storage container 322 separate from second container 300. Storage container 322 may be mounted to exterior wall 352 of building 352 (not shown), or alternatively, may be placed adjacent to exterior wall 352 of building 150. In some embodiments (not shown) pneumatic apparatus 120 may be placed in the interior of building 150 to protect pneumatic apparatus 120 from weather elements and wildlife. However, second conduit 314 may then extend through external wall 352 to second container 300.

Second container 300 may have a housing that defines an inner cavity that may hold a second volume of fuel pellets that is significantly less that the volume of fuel pellets that can be held in first container 200. By way of example, first container 200 may have a fuel pellet storage capacity in the range of 100 to 200 kilograms, whereas second container 300 may have a storage capacity of fuel pellets in the range of one or more tons.

Shown in FIGS. 4A and 4B is a schematic view of first conduit 212 connecting first and second containers 200, 300 and placing first container 200 in fuel pellet and air flow communication with second container 300 to permit the transfer of fuel pellets from first container 200 to second container 300. First conduit 212 may be connected at one end 211 to flow regulator 240 at the bottom portion of first container 200, and the second end 209 to the top portion of second container 300.

Also shown in FIGS. 4A and 4B is a schematic view of second conduit 314 connecting second container 200 and pneumatic apparatus 120. Second conduit 314 may be connected at an inlet end 315 to a top portion of second container 200, and at the second end to suction end 324 of pneumatic apparatus 120, which is configured to draw air out of enclosed second container 300. Inlet end 315 of second conduit 314 may be positioned suitably in relation to outlet end 209 of first conduit 212 to efficiently create a reduced pressure within the cavity of second container 300 and an air flow that passes through the upper portion of the cavity of second container 300.

It will however be appreciated, that the air flow created by pneumatic apparatus 120 should not be such that fuel pellets exiting outlet end 209 of first conduit 212 are drawn into inlet end 315 of second conduit 314. Rather, fuel pellets exiting outlet 209 should remain in second container 300. This may be achieved in some embodiments by arranging inlet end 315 and outlet end 209 at an offset along the vertical axis relative to one another. This may also be achieved by attaching a mesh at inlet end 315 of second conduit 314, which blocks wood pellets from entering conduit 314 but permits air to flow.

Second container 300 is generally enclosed, particularly if trapdoor 502 closed, preventing air from flowing through conduit 318 into second container 300 from other than conduit 212. Thus, when pneumatic apparatus 120 is selectively operated to generate an air pressure differential between first container 200 and second container 300 (e.g. by reducing the air pressure in second container 300), air will flow from the inner cavity of container 300 to pneumatic apparatus 120. This will create an air flow from conduit 212 and from first container 200 into conduit 212. This air flow will thereby selectively generate an air flow force that generates forces that move fuel pellets held in first container 200 through first conduit 212 to said second container 300.

By drawing air from second container 300, pneumatic apparatus 120 reduces the air pressure inside enclosed second container 300 relative to the air pressure of first container 200 and relative to atmospheric air pressure. Pneumatic apparatus 120 therefore generates an air pressure within enclosed second container 300 that is lower than the air pressure with first container 200. If the difference in air pressure between first and second containers 200, 300 is sufficiently large, then pneumatic apparatus 120 will cause fuel pellets 232 held in first container 200 to be communicated from first container 200 to second container 300 by the resultant air flow.

After pneumatic apparatus 120 is switched off, the pressure differential between first container 200 and second container 300 may decrease substantially such that the air pressure within second container 300 returns to atmospheric air pressure.

As discussed above, second container 300 may have an inner cavity that is substantially air-sealed. It is generally easier for a pneumatic apparatus 120 to reduce the air pressure of a substantially air-sealed container 300. Accordingly, for a given pneumatic apparatus 120, when second container 300 is substantially air-sealed, pneumatic apparatus 120 will generate a larger pressure difference between first and second containers 200, 300 than if second container 300 was not substantially air-sealed.

Similarly, when second container 300 is substantially air-sealed, a pneumatic apparatus 120 providing a relatively lower-maximum suction power may be used.

Similarly, to compensate for any air-leakage in second container 300, a pneumatic apparatus 120 device having a relatively higher maximum suction power may be used. However, a more powerful pneumatic apparatus 120 will require more power and energy to operate and may generate more noise and heat. Further, if second container 300 has large openings and large air-leaks, then pneumatic apparatus 120 will not be able generate a pressure difference between first and second containers 200, 300 to create an air flow that is sufficient to cause fuel pellets held in first container 200 to be communicated from first container 200 to second container 300.

While the inner cavity of second container 300 may be generally enclosed and airtight, second container 300 also has openings to receive first conduit 212, second conduit 314, and third conduit 318. To improve the air-seal of second container 300, the pipes of each of first conduit 212, second conduit 314, and third conduit 318 may be provided with sealed connections to the walls of container 300 and/or the openings in the inner cavity of container 300, using glue, caulking, or other sealing compounds. Further, any gaps or openings in or between the walls of container 300 may be sealed using glue, caulking or other sealing compounds. Further, trapdoor 502 may be designed to be substantially airtight to reduce loss of pressure at and through third conduit 318.

Inlet end 315 of second conduit 314 may be connected at the top portion of second container 300 to avoid suction of fuel pellets 334 stored in second container 300 into pneumatic apparatus 120.

During operation of pneumatic apparatus 120, fuel pellets 232 held in upper compartment 202 of first container 200 may be communicated at least in part, by gravity, to the bottom portion 244 of first container 200 and into flow regulator 240. Once at flow regulator 240, the air pressure difference between first and second containers 200, 300 (when sufficiently large) causes fuel pellets to be communicated from flow regulator 240 of first container 200 and into the top portion of second container 300.

The flow rate of fuel pellets between first and second containers 200, 300 will depend, in part, on the suction power of pneumatic apparatus 120, the length of first conduit 212, the air-seal of second container 300 and the system generally, and the size and weight of fuel pellets.

Depending upon the relative height positioning of inlet 211 to second container 300 compared to the outlet 209 from first container 200, pneumatic apparatus 120 may have to generate sufficient air flow between first container 200 and second container 300 to overcome not only physical/frictional resistive forces resisting movement of the fuel pellets, but also gravitational forces (for example, as shown in FIGS. 4A and 4B).

Reference is now made to FIGS. 5A and 5B showing interior 340 of building 150. In interior 340 of building 150 is opening 524 going through wall 352 and which may be selectively sealed by trapdoor 502 mounted to the interior side of wall 352.

Trapdoor 502 may be movable between a closed position (FIG. 5A) and an open position (FIG. 5B). When in the open position, trapdoor 502 permits the transfer of fuel pellets from second container 300 to interior 340 of building 150 through third conduit 318. When in the closed position, trapdoor 502 seals opening 524 and seals third conduit 318. Trapdoor 502 may be configured as a sliding door/gate 536 which slides up and down (or right and left) to open and close, and a handle 534 to allow an operator to easily open and close the sliding door/gate. Sliding door/gate 536 may be made of plexiglass (which may aid in creating an air seal). Sliding door/gate 536 may be held in a place against wall 532 by a wooden or metallic frame. Other/additional sealing mechanisms may be employed to provide a seal between the sliding door and the wall/conduit.

In the interior of building 150, at the receiving end of opening 524, is third container 504. Third container 504 has an open top portion and is preferably a movable container that can be positioned to receive fuel pellets flowing out of second container 300 at the interior side of exterior wall 352. Movable third container 504 may then be used by an operator to carry fuel pellets inside building 150 to a fuel pellet stove and/or furnace.

In one illustrative embodiment, pneumatic apparatus 120 is a vacuum, such as a drum model Shop Vac®, which generates suction. In one illustrative embodiment, pneumatic apparatus 120 is a six horse-power vacuum cleaner, which is connected to a second conduit 314 having a two inch diameter inner passage. Further, first, second, and third conduits 212, 314, 318 may be made of PVC piping. Further, a two inch inner passageway diameter pipe is suitable for first conduit 212 and a 3.5 inch inner passageway diameter pipe is suitable for third conduit 318. This example setup may be suitable for moving fuel pellets (in particular, wood pellets) of standard industry size and weight (i.e. approx. 1.5 inch in length and 0.25 inch in diameter) along a first conduit 212 of up to 70 feet. Accordingly, first container 200 may be placed approx. 70 feet away from building 150. In this embodiment, it is observed that approx. 40 pounds of fuel pellets may be communicated every minute from first container 200 to second container 300. Such example parameters are merely illustrative, and a person of ordinary skill in the art will appreciate that modifications to such parameters are possible and may in fact be required for a given implementation.

In some embodiments, first container 200 is configured to store approx. 1 to 5 tons of fuel pellets (or an amount sufficient for 3-12 months' use) and second container 300 is configured to store approx. 100 to 200 kilograms of fuel pellets (or an amount sufficient for 3-14 days' use). Of course such parameters are merely illustrative and may be modified to suit any given implementation. However, as indicated above, first container 200 may be significantly larger in fuel pellet storage volume than second container 300. Further, the maximum capacity of first container 200 may have to be decreased if a flow regulator is not used as fuel pellets are more likely to clog first conduit without flow regulator. The maximum capacity of second container 300 may also be limited if second container 300 is mounted to an external wall of building 150.

System 100 is therefore suited for transferring a plurality of fuel pellets from a location external to building 150 to a location in an interior of the building. In operation, an operator causes first container 200 to receive and hold a first volume of fuel pellets 232. In one example, volume 232 is delivered to first container 200 by a truck.

Once first container 200 is holding volume 232 for storage, an operator may selectively operate pneumatic apparatus 120 to generate first air pressure within enclosed second container 300 that is lower than a second air pressure in first container 200 and sufficient to cause fuel pellets held in first container 200 to be communicated from first container 200 to second container 300. The air pressure difference created by pneumatic apparatus 120 thereby creates an air flow sufficient to transfer fuel pellets held in first container 200 to second container 300. As previously explained, a larger air pressure difference can be created without increasing the power of pneumatic apparatus 120 if second container 300 is substantially air-sealed.

Once second container 200 is holding a volume of fuel pellets 334 for storage, an operator may move trapdoor 502 mounted at a location in an interior of building 150 from a closed position to an open position to communicate fuel pellets from second container 200 to the interior of building 150. In one embodiment, fuel pellets 334 held in second container 200 are communicated to the interior of building 150 by gravitational force. An operator may also position a movable third container 504 to receive fuel pellets being transferred from second container 300 to the interior of building 150.

Figure 6:
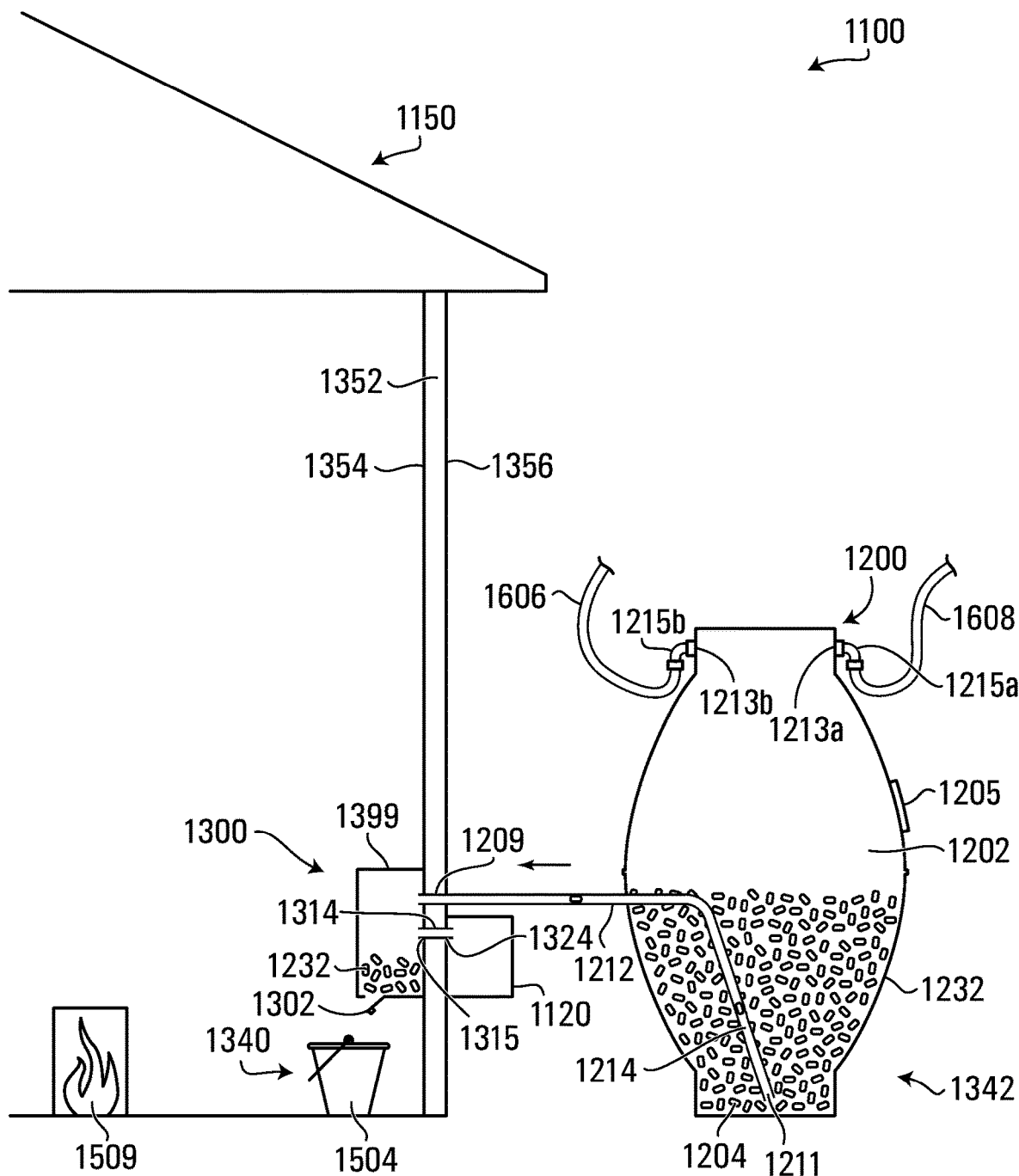
FIG. 6 shows a schematic view of components of a pellet transfer system in accordance with one embodiment.
Figure 10:
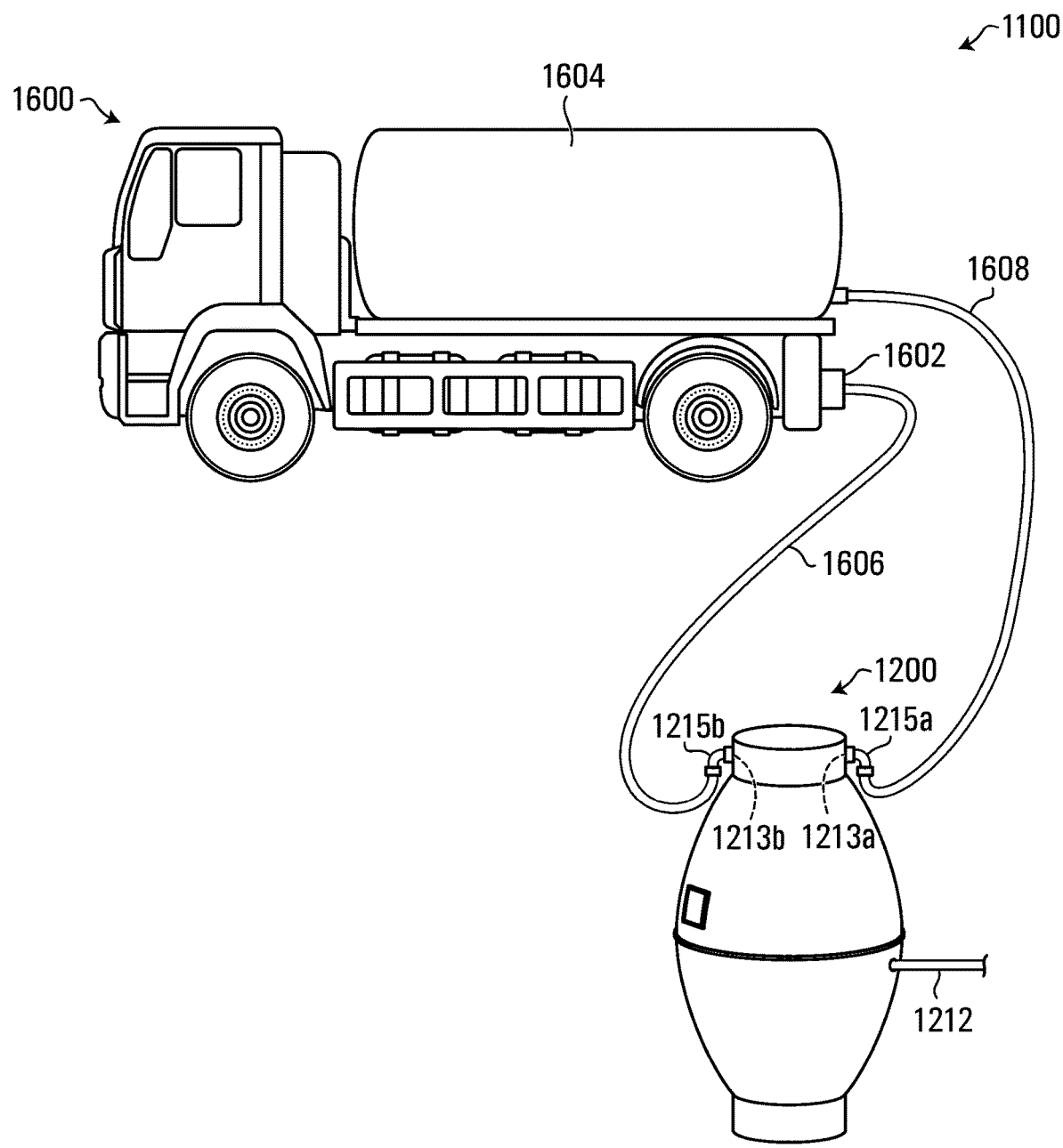
FIG. 10 show a schematic view of part of a pellet transfer system employing the first container of FIG. 7 and a fuel pellet delivery truck, in accordance with an embodiment.

With reference to FIGS. 6 and 10, a schematic view of a system 1100 for transferring/moving fuel pellets 1232 is illustrated that may include a truck 1600 (FIG. 10), a first container 1200, a second container 1300, and a pneumatic apparatus 1120 as well as various conduits interconnecting those components. Second container 1300 is located in the interior 1340 of a building 1150 that may have an exterior wall 1352 (which may be a vertical wall as shown or in other embodiments, another wall or barrier such as a floor slab—at another orientation). Building 1150 may include a fuel pellet burner 1509. Wall 1352 may have an interior surface 1354 and an exterior surface 1356. First container 1200 is positioned at a location at the exterior 1342 of building 1150, and that may be remote from second container 1300. For example, first container 1200 may be positioned apart from building 1150 at an approximate distance in the range of about 10 (or less) feet to 70 feet, or possibly more.

First container 1200 may have a housing that defines an inner cavity 1202 that may hold a first volume of fuel pellets 1232. The housing defining the cavity 1202 of first container 1200 may be made of one or more strong, durable, air permeable and non-water permeable, materials. For example, the housing of container 1200 may be made of wood, rigid plastic, or metal. In some embodiments, the one or more materials forming first container 1200 may be non-air permeable materials, but first container 1200 may otherwise have openings or channels that allow air to flow into the inner cavity 1202 of first container 1200, such as from the environment, in order to create the required air flows described herein.

The housing of first container 1200 may be a multi-layer construction and may include an outer layer and an inner layer providing a surface that defines the wall of the inner cavity 1202. Both inner and outer layers may be made of materials that are plyometric, wooden, composite or metallic. For example, first container 1200 may be made from fibreglass.

Second container 1300 may also be generally enclosed and may be positioned in the interior 1340 of building 1150. Second container 1300 may have a housing that defines an inner cavity 1399 that may hold a second volume of fuel pellets 1232. The housing defining the cavity of second container 1300 may be made of one or more strong, durable, non-air and non-water permeable materials. For example, the housing of container 1300 may be made of wood, rigid plastic, metal. The volume of inner cavity 1399 inside second container 1300 may be substantially smaller than the volume of inner cavity 1202 inside first container 1200.

The housing of second container 1300 may also be a multi-layer construction and may include an outer layer and an inner layer providing a surface that defines the wall of the inner cavity 1399. Both inner and outer layers may be made of materials that are plyometric, wooden, or metallic. In a specific embodiment, second container 1300 is made from fibreglass.

Also, as shown in FIG. 6, pneumatic apparatus 1120 may be positioned proximate/adjacent to building 1150, but is located external to/outside of building 1150. For example, pneumatic apparatus 1120 may be affixed to the exterior surface 1356 of exterior wall 1352. Pneumatic apparatus 1120 may for example be powered by a source of electrical power and be operated by an electronic or electro-mechanical switch, another wireless or wired activation/de-activation device, or a similar type of operational device that may be physically located within the building 1150, but which is in communication with and capable of operating the pneumatic apparatus 1120 located outside of said building (eg. such as by electrical wiring incorporated into a circuit that includes an electrical switch and pneumatic apparatus 1120 and the source of electrical power).

Also shown schematically in FIG. 6 is a first conduit 1212, that may fluidly connect the inner cavities 1202, 1399, of respectively first and second containers 1200, 1300 to provide for air flow as well as fuel pellet communication through exterior wall 1352 of building 1150. A second conduit 1314 (shown schematically in FIG. 6) may fluidly connect inner cavity 1202 of second container 1200 and pneumatic apparatus 1120 to provide for air flow communication from inner cavity 1399 of second container 1300 through exterior wall 1352 to produce a reduced air pressure within inner cavity 1399 compared to the air pressure within inner cavity 1202, sufficient to cause an air flow from inner cavity 1202 to inner cavity 1399 through conduit 1212, as described further hereinafter.

In close proximity to a sealable opening 1302 of second container 1300 may be a placed a third container 1504 (such as by a manual operator or an automated apparatus) for receiving fuel pellets 1232 that flow through an opening 1302 in second container 1300 when opening 1302 is in an open operational configuration.

Accordingly, first container 1200 is also in fuel pellet communication with second container 1300, through first conduit 1212, to permit the transfer of fuel pellets 1232 from first container 1200 to second container 1300. As such, fuel pellets are transferred from the exterior 1342 to the interior 1340 of building 1150.

Figure 7A:
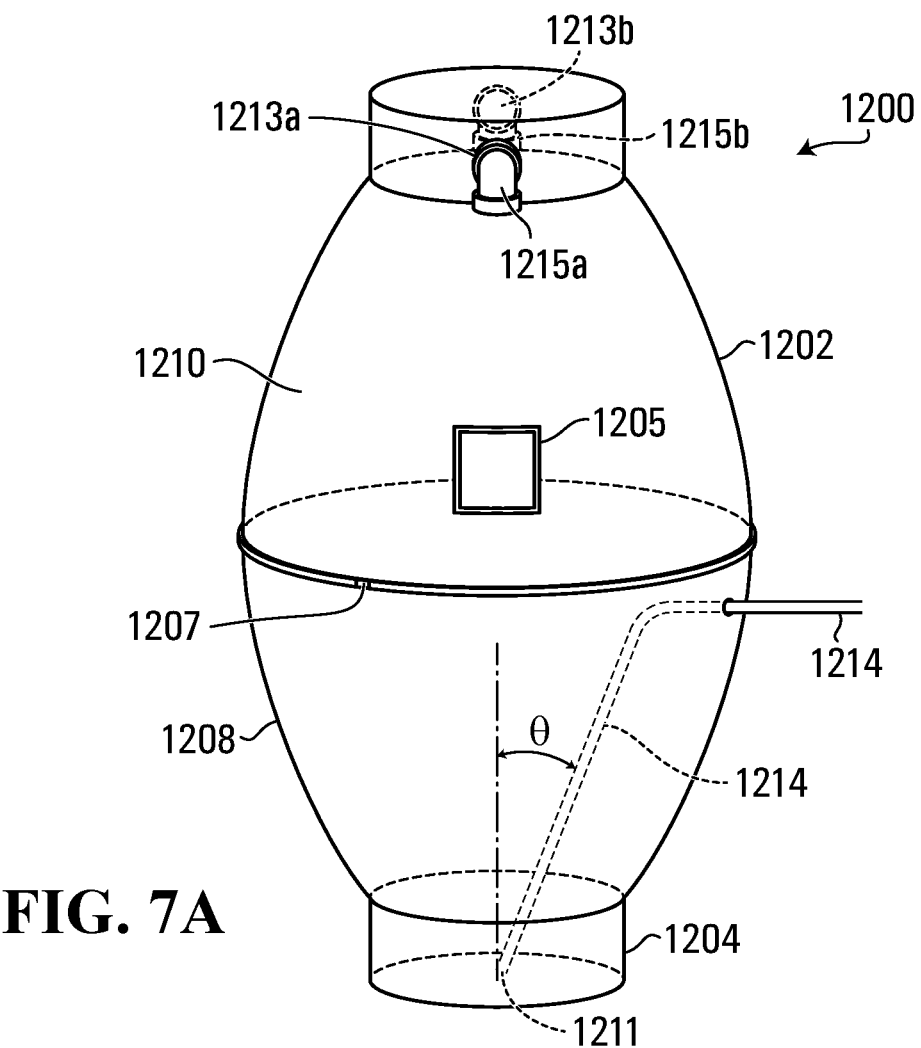
FIG. 7A shows a perspective isolated view of a first container of the components depicted in FIG. 6.

Reference is now made to FIG. 7A illustrating an example embodiment of first container 1200 in a perspective isolated view. First container 1200 may be constructed to provide inner storage cavity 1202 from lower and upper wall halves 1208 and 1210 respectively. Lower wall half 1208 may have a lower cylindrical portion that widens to form a half-ovoid cavity that terminates at a flanged opening. Upper wall half 1210 may have a similar profile but is inverted with respect to lower wall half 1208 and joined together such that flanged openings are in communication with and adjacent to each other. Lower and upper wall halves 1208 and 1210 may be secured by a ring clamp 1207. Through this arrangement, first container 1200 can be readily dissembled and reassembled for maintenance and transportation. When secured together lower and upper wall halves 1208 and 1210 form a generally ovoid shaped inner cavity 1202.

The ovoid shaped wall surface of first container 1200 may allow, at least in part, fuel pellets to be forced at least in part by gravity towards the bottom wall portion 1204 of container 1200. First conduit 1212 may extend through lower wall half 1208 and may include an inlet end 1214 that extends downwards at an angle Θ (FIG. 7A) towards the bottom wall portion 1204 of container 1200. Inlet end 1214 terminates at inlet 1211, located in proximity to bottom wall portion 1204 and operable to permit the transfer of fuel pellets 1232 from the bottom wall portion 1204 of first container 1200 and into conduit 1212.

First container 1200 may have a total height of by way of example only, 84 inches and the flanged openings of lower and upper halves 1208 and 1210 may have inner diameters where they are joined of, by way of example only, 47 inches. The angle Θ of inlet end 1214 of conduit 1212 as indicated on FIG. 7A may be between 23 and 30 degrees and preferably 23 degrees, for example. The inlet 1211 of conduit 1212 may also be raised from the bottom portion 1204 of first container 1200 by approximately 2 inches.

Figure 7B:
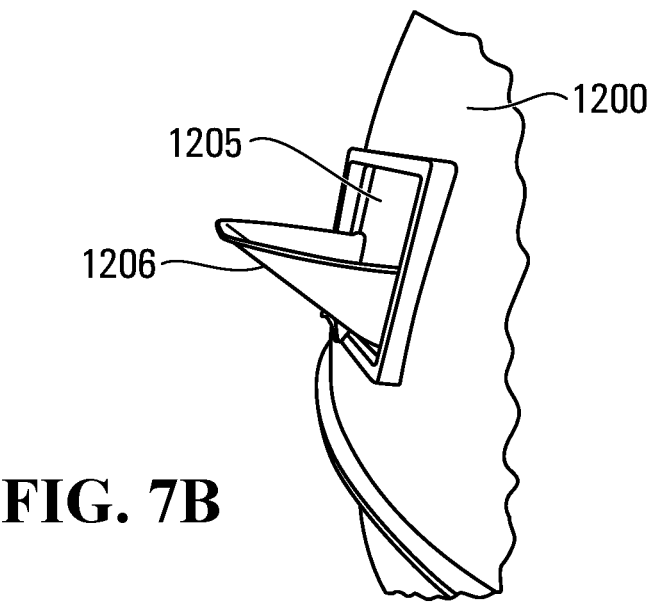
FIG. 7B shows an enlarged perspective isolated view of part of the first container of FIG. 7A.

First container 1200 may have a first opening 1205 with a hinged door 1206 that may be selectively opened and closed. When the door 1206 is in an open configuration, as shown in FIG. 7B, an operator may transfer fuel pellets from a bag or sack. Conveniently, when in an open configuration, door 1206 may act as a funnel to aid the transfer of fuel pellets into opening 1205. Opening 1205 may also allow an operator to access the inner cavity 1202, for example to clean first container 1200.

First container 1200 may also have second and third openings 1213a, 1213b respectively located on opposite sides of the cylindrical portion of upper wall half 1210. Openings 1213a, 1213b may allow the transfer of fuel pellets to first container 1200 from a delivery apparatus (e.g. truck 1600 in FIG. 10) into the inner cavity 1202 using a pellet movement system such as a pneumatic system. Openings 1213a, 1213b may each have respective fittings 1215a and 1215b attached thereto, which extend downwards from first container 1200 in order to prevent (or at least minimize) the ingress of weather elements such as rain or snow into first container 1200.

Importantly, when pneumatic apparatus 1120 (which is located outside of building 1150), is activated from inside building 1150, air is drawn from inner cavity 1399 of second container 1300, through conduit 1314 (that extends through exterior wall 1352), into pneumatic apparatus 1120 from which it may be expelled. The movement of air out of second container 1300 causes air to flow from inner cavity 1202 of container 1200 (which is then at a higher air pressure that inner cavity 1399 of second container 1300) and into inlet 1211 of conduit 1212 due to the pressure differential that is created between inner cavity 1202 of first container 1200 and inner cavity 1399 of second container 1300 by pneumatic apparatus 1120. Fuel pellets in container 1200 may then be drawn by the air flow generated, through the gap between the bottom of conduit 1212 and bottom portion 1204 of container 1200, into conduit 1212 and through exterior wall 1352, and subsequently into inner cavity 1399 of second container 1300.

By locating pneumatic apparatus 1120 on the exterior 1342 of building rather that in its interior 1340, noise and vibrations within building 1150 may be reduced or even substantially eliminated. The noise and vibrations within building 1150 may also be reduced by limiting the air flow passages between the exterior and interior of the building 1150, such as by providing conduit 1314 as the only air flow/passageway link between pneumatic apparatus 1120 and inner cavity 1399 of second container 1300, and/or providing conduit 1212 as the only air flow link between second container 1300 and first container 1200.

By also providing a gap between inlet 1211 of conduit 1212 and the bottom surface 1204 of container 1200, additional air flow from first container 1200 to second container 1300 (through conduit 1212) may be permitted when pneumatic apparatus 1120 is activated. As a result, this may help ensure that fuel pellets held in first container 1200 are communicated through first conduit 1212 in combination with an air flow to second container 1300. This may reduce the likelihood that the inlet 1211 of first conduit 1212 will become clogged by fuel pellets during operation of pneumatic apparatus 1120.

Further, as fuel pellets may be communicated in combination with an air flow which passes through inlet 1211 of conduit 1212, the number of fuel pellets that can enter first conduit 1212 may be controlled; reducing the likelihood that first conduit 1212 will become clogged.

Reference is now made to FIGS. 8A and 8B where example embodiments of enclosed second container 1300 connected with pneumatic apparatus 1120 are shown. Notably, shown in FIGS. 8A and 8B are schematic views of second conduit 1314 connecting second container 1200 and pneumatic apparatus 1120 through exterior wall 1352 of building 1150 in order to create a desired low air pressure in the cavity of second container 1300. Second conduit 1314 may extend horizontally through exterior wall 1352 of building 1150 and terminates within second container 1300.

As shown in FIG. 8A and FIG. 8B, second container 1300 may be an enclosed container mounted (such as with screws, nuts/bolts or similar devices) to the interior surface 1354 of external wall 1352 of building 1150 by any suitable means. In FIG. 8A, pneumatic apparatus 1120 may be mounted (such as with screws, nuts/bolts or similar devices) to the exterior surface 1356 of external wall 1352 whilst in FIG. 8B, pneumatic apparatus 1120 may be located at another location in the exterior 1342 of building 1150 remote from external wall 1352. Pneumatic apparatus 1120 may be within a storage container 1322 to protect pneumatic apparatus 1120 from weather elements and wildlife.

FIG. 8A illustrates a convenient place to locate pneumatic apparatus 1120 for several reasons. First, pneumatic apparatus 1120 can be placed in close proximity to second container 1300, thereby increasing its effectiveness at transporting fuel pellets. Further, by locating pneumatic apparatus 1120 on the exterior 1342 of building rather than the interior 1340, noise and vibrations within building 1150 may be reduced or even substantially eliminated.

Second container 1300 may have a housing that defines inner cavity 1399 that may hold a second volume of fuel pellets that is significantly less that the volume of fuel pellets that can be held in first container 1200. By way of example, first container 1200 may have an inner cavity 1202 of a volume in the range of 50 to 80 ft$^3$ that provides a fuel pellet storage capacity in the range of 900 to 1500 kilograms, whereas second container 1300 may have an inner cavity 1399 with a volume in the range of 1.5 to 4 ft³ that provides a storage capacity of fuel pellets in the range of 25-60 kilograms.

In some embodiments, second container 1300 may be located in a basement level of building 1150 (eg. entirely below the level of the ground outside upon which first container 1200 rests). In other embodiments, as the filling of container 1300 with fuel pellets is not reliant, at least not entirely, upon the use of the force of gravity to transfer fuel pellets from first container 1200 to second container 1300, second container 1300 may (with an appropriately configured system 1100 including an appropriately selected pneumatic apparatus 1120) be located at the ground level of building 1150 or at an above ground level of the building 1150 (eg. container 200 is entirely located at a height that is above first container 1200)

With reference again to FIG. 6, first conduit 1212 connects first and second containers 1200, 1300 and places first container 1200 in fuel pellet and air flow communication with second container 1300 to permit the transfer of fuel pellets from first container 1200 to second container 1300. First conduit 1212 may be connected at inlet 1211 to the bottom portion 1204 of first container 1200, and the second end 1209 to the top portion/region of second container 1300, and above the outlet 1315 of conduit 1314.

In conditions when neither pneumatic apparatus 1120 (nor on-board vacuum generating unit 1602 of truck 1600 as described below) is operating, the air pressure in first container 1200, second container 1300 and conduits 1212 and 1314 will be at normal atmospheric/ambient pressure.

Also shown in FIG. 6 is a schematic view of second conduit 1314 connecting second container 1200 and pneumatic apparatus 1120. Second conduit 1314 may be connected at an inlet end 1315 to a top portion/region of second container 1200, and at the second end to suction end 1324 of pneumatic apparatus 1120, which is configured to draw air out of enclosed second container 1300. Inlet end 1315 of second conduit 1314 may be positioned suitably in relation to outlet end 1209 of first conduit 1212 to efficiently create a reduced pressure within the cavity of second container 1300 and an air flow that passes through the upper portion of the cavity of second container 1300.

It will however be appreciated, that the air flow created by pneumatic apparatus 1120 should not be such that fuel pellets exiting outlet end 1209 of first conduit 1212 are drawn into inlet end 1315 of second conduit 1314. Rather, fuel pellets exiting outlet 1209 should remain in second container 1300. This may be achieved in some embodiments, at least in part, by arranging inlet end 1315 and outlet end 1209 at an offset along a vertical axis relative to one another. This may also be achieved or assisted by attaching a mesh at inlet end 1315 of second conduit 1314, which blocks wood/fuel pellets from entering conduit 1314 but permits air to flow there through.

During operation, dust and sufficiently small pieces of debris within second container 1300, may be drawn though inlet end 1315 of second conduit 1314, into pneumatic apparatus 1120 and be exhausted to the exterior 1342 of building 1150. Such material is not of a sufficient size to cause damage to pneumatic apparatus 1120 and by removing it from second container 1300, dust within the interior 1340 of building 1150 is minimized.

Other than via conduits 1212 and 1314, inner cavity 1399 of second container 1300 is generally enclosed, at least when transferring fuel pellets from first container 200 to second container 1300, such that air is prevented air from flowing through opening 1302 into inner cavity 1399 of second container 1300. Thus, when pneumatic apparatus 1120 is selectively operated to generate an air pressure differential between first container 1200 and second container 1300 (e.g. by reducing the air pressure in second container 1300), air will flow from the inner cavity of container 1300 to pneumatic apparatus 1120. This will create an air flow from conduit 1212 from first container 1200 into conduit 1212. This air flow will thereby selectively generate an air flow force that generates forces that moves fuel pellets held in first container 1200 through first conduit 1212 to said second container 1300.

By drawing air from second container 1300, pneumatic apparatus 1120 reduces the air pressure inside enclosed second container 1300 relative to the air pressure of first container 1200 and relative to atmospheric air pressure. Pneumatic apparatus 1120 therefore generates an air pressure within cavity 1399 of enclosed second container 1300 that is lower than the air pressure within inner cavity 1202 of first container 1200. If the difference in air pressure between first and second containers 1200, 1300 is sufficiently large, then pneumatic apparatus 1120 will cause fuel pellets 1232 held in first container 1200 to be communicated from first container 1200 to second container 1300 by the resultant air flow.

After pneumatic apparatus 1120 is switched off, the pressure differential between first container 1200 and second container 1300 may decrease substantially such that the air pressure within second container 1300 (and throughout the rest of system 1100) returns to atmospheric air pressure.

As discussed above, second container 1300 may have an inner cavity that is substantially air-sealed. It is generally easier for a pneumatic apparatus 1120 to reduce the air pressure of a substantially air-sealed container 1300. Accordingly, for a given pneumatic apparatus 1120, when second container 1300 is substantially air-sealed, pneumatic apparatus 1120 will generate a larger pressure difference between first and second containers 1200, 1300 than if second container 1300 was not substantially air-sealed.

Similarly, when second container 1300 is substantially air-sealed, a pneumatic apparatus 1120 providing a relatively lower-maximum suction power may be used.

Similarly, to compensate for any air-leakage in second container 1300, a pneumatic apparatus 1120 device having a relatively higher maximum suction power may be used. However, a more powerful pneumatic apparatus 1120 will require more power and energy to operate and may generate more noise and heat. Further, if second container 1300 has large openings and large air-leaks, then pneumatic apparatus 1120 may not be able generate a sufficient pressure difference between first and second containers 1200, 1300 to create an air flow that causes fuel pellets held in first container 1200 to be communicated from first container 1200 to second container 1300. This may particularly be the situation where second container 1300 is generally located at a higher location than first container 1200 (or at least outlet 1209 of conduit 1212 is higher than inlet 1211) such that the air flow must be sufficient to overcome gravity in addition to other resistance forces when fuel pellets travel within conduit 1212.

While the inner cavity of second container 1300 may be generally enclosed and airtight, second container 1300 also has openings to receive first conduit 1212, second conduit 1314 and opening 1302. To improve the air-seal of second container 1300, the pipes of each of first conduit 1212 and second conduit 1314 may be provided with sealed connections to the walls of container 1300 and/or the openings into the inner cavity 1399 of container 1300, using glue, caulking, or other sealing compounds. Further, any gaps or openings in or between the walls of container 1300 may be sealed using glue, caulking or other sealing compounds. Further, opening 1302 may be designed to be substantially airtight to reduce loss of pressure when in a closed position.

Inlet end 1315 of second conduit 1314 may be connected at the top portion (eg. at the uppermost top region) of second container 1300 to minimize the risk/avoid suction of fuel pellets 1232 stored in second container 1300 being sucked into pneumatic apparatus 1120.

During operation of pneumatic apparatus 1120, fuel pellets 1232 held in inner cavity 1202 of first container 1200 may be communicated at least in part, by gravity, to the bottom portion 1204 of first container 1200. The air pressure difference between first and second containers 1200, 1300 (when sufficiently large) causes fuel pellets to be communicated from bottom portion 1204 of first container 1200, into inlet 1211 of first conduit 1212, through conduit 1212, and into the top portion of second container 1300.

The flow rate of fuel pellets between first and second containers 1200, 1300 will depend, in part, on the suction power of pneumatic apparatus 1120, the length of first conduit 1212 (and the internal resistance associated therewith), the cross sectional size/profile of conduit 1212, the proficiency/efficiency of the air-seal of second container 1300 and the system generally, and the size and weight of the fuel pellets (which may have a range of sizes and weights).

Depending upon the relative height positioning of inlet 1211 to second container 1300 compared to the outlet 1209 from first container 1200, pneumatic apparatus 1120 may have to generate sufficient air flow between first container 1200 and second container 1300 to overcome not only physical/frictional resistive forces resisting movement of the fuel pellets, but also gravitational forces.

Figure 9A:
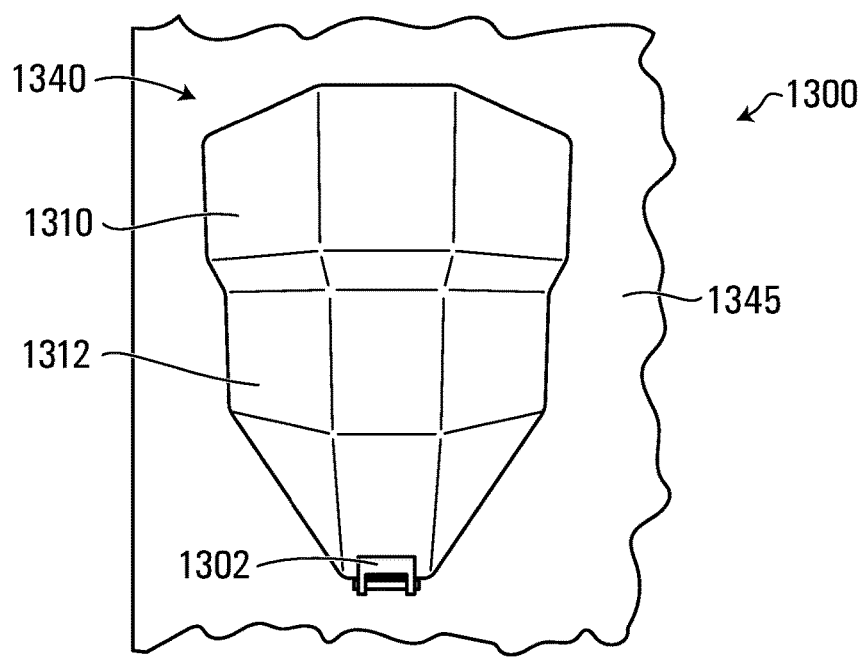
FIG. 9A shows a front view of a second container of the components depicted in FIG. 6.
Figure 9B:
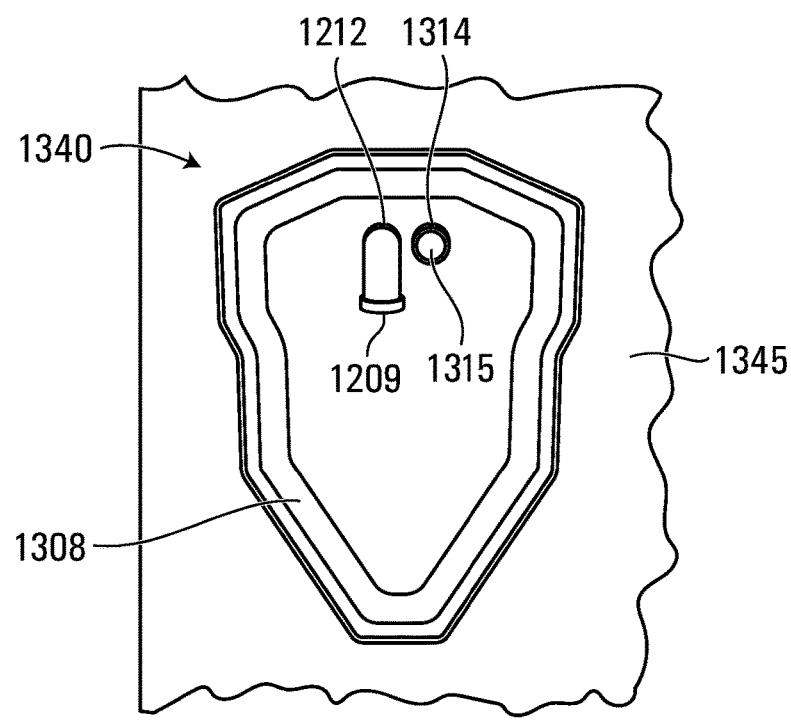
FIG. 9B shows a front view of the interior surface of a rear plate portion of the second container of FIG. 9A.

Reference is now made to FIGS. 9A and 9B showing interior 1340 of building 1150 where second container 1300 may be affixed to the interior surface 1354 of exterior wall 1356 by any suitable means. Second container 1300 may include a rear plate 1308 and a front housing 1310, which may be sealed together using glue, caulking, or other sealing compounds to form an airtight seal to form inner cavity 1399.

Figure 9C:
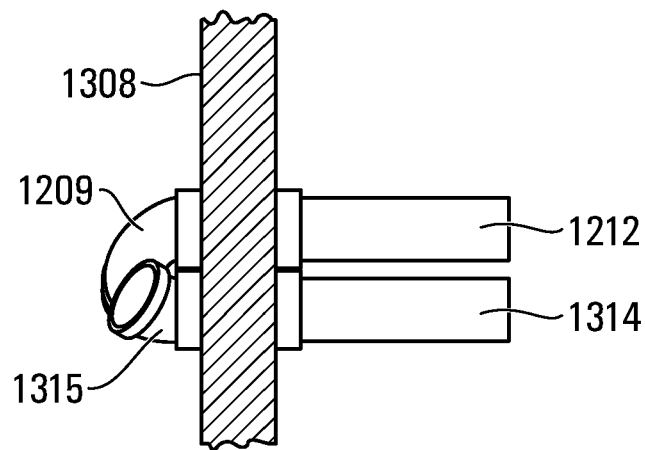
FIG. 9C shows a top view of the rear plate portion of the second container of FIG. 9A and components extending therethrough.

FIGS. 9B and 9C show the preferred relative positions of second end 1209 of first conduit 1212 and inlet end 1315 of second conduit 1314 within inner cavity 1399. Rear plate 1308 may have two openings located towards the upper end for receiving first and second conduits 1212, 1314 therethrough. Rear plate 1308 may have a total length of 36 inches and be 22 inches wide at the widest point, for example.

The inner surface of front housing 1310, along with the inner surface of rear plate 1308, define inner cavity 1399 for receiving pellets through first conduit 1212.

Figure 9D:
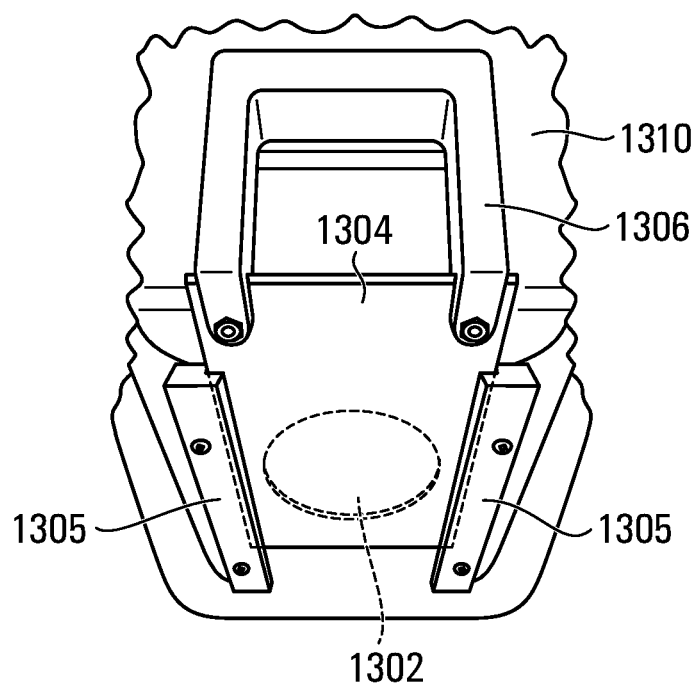
FIG. 9D shows an enlarged bottom front perspective view of the second container of FIG. 9A.

With reference to FIG. 9D, opening 1302 of second container 1300 may be in either an open operational configuration, or a closed operational configuration where the opening 1302 is sealed by a trap door 1304. Trapdoor 1304 may be retained by tracks 1305 and may be movable horizontally within tracks 1305 between a closed position and an open position through movement of handle 1306 by an operator. When in the open position, trapdoor 1304 permits the selective transfer of fuel pellets out of second container 1300 through opening 1302 due to gravity. When in the closed position, trapdoor 1304 seals opening 1302, assisting in sealing second container 1300. Trapdoor 1304 may be made of plexiglass, which may aid in creating an air seal. Other/additional sealing mechanisms may be employed to provide a seal between trapdoor 1304 and opening 1302.

In other embodiments, trapdoor 1304 may be operable by another mechanism, such as a hinged connection, for example.

In another embodiment, second container 1300 may be affixed to any other internal or external wall of building 1150. In yet another embodiment, second container 1300 may be free standing and positioned at any other location within the interior 1340 of building 1150.

Trapdoor 1304 will assist in sealing the interior cavity of container 1300 such that any air flow generated within the interior cavity will flow from conduit 1212 and into the pneumatic apparatus 1120, thus increasing the efficiency of the pneumatic apparatus in creating the desired low air pressure in the cavity of second container 300 and the consequent air flow through conduit 1212 from first container 1200.

With particular reference to FIGS. 9B and 9C, first conduit 1212 and second conduit 1314 may extend through wall 1352 and through back plate 1308 of second container 1300 at substantially the same height and terminate within inner cavity 1399 of second container 1300 at substantially the same vertical height but may be spaced apart horizontally. Further, the second end 1209 of first conduit 1212 may be angled downwards and/or the inlet end 1315 of second conduit 1314 may be angled upwards. Furthermore, the second end 1209 of first conduit 1212 may be located vertically below the inlet end 1315 of second conduit 1314. Such an arrangement may also help ensure (or at least minimize the risk that) the pellets exiting through second end 1209 of first conduit 1212 are not drawn into inlet end 1315 of second conduit 1314 as a result of the airflow into second conduit 1314, thus avoiding suction of fuel pellets 1232 stored in second container 1300 into pneumatic apparatus 1120

In the interior of building 1150, at the receiving end of opening 1302, may be located third container 1504. Third container 1504 may have an open top portion and may be a movable container that can be positioned to receive fuel pellets flowing out of trapdoor 1502 of second container 1300 at the interior surface 1354 of exterior wall 1352. Movable third container 1504 may then be used by an operator to move fuel pellets inside building 1150 to a fuel pellet stove and/or furnace or other burner.

In one illustrative embodiment, pneumatic apparatus 1120 is a vacuum generating/pump type system, which generates suction. In one illustrative embodiment, pneumatic apparatus 1120 may have a 120V, 8 A, 2-stage electric motor, which is capable of generating 84.3 cubic feet per minute of air flow within second conduit 1314. Further, first and second conduits 1212, 1314 may be made of PVC piping. A 1.5 inch inner passageway diameter pipe may be suitable for second conduit 1314. Further, a two-inch inner passageway diameter pipe may be suitable for first conduit 1212. This example setup may be suitable for moving fuel pellets (in particular, wood pellets) of standard industry size and weight (i.e. approx. 1.5 inch in length and approximately 0.25 inch in diameter) along a first conduit 1212 of up to 16 inches. Accordingly, first container 1200 may be placed approx. up to 70 feet away from building 1150. In this embodiment, it is observed that approx. 40 pounds of fuel pellets may be communicated every minute from first container 1200 to second container 1300. The air pressure generated in second container 1300 when pneumatic apparatus 1120 is activated may be below atmospheric pressure and may be in the range of 3 to 5 psi. The air pressure differential created between first container 1200 and second container 1300 when pneumatic apparatus 1120 is activated may be in the range of 3 to 5 psi.

By way of example only, pneumatic apparatus 1120 may be an electrical powered vacuum air pump capable of generating a volume flow rate of 84 cfm at the pump inlet. For example, pneumatic apparatus 120 may be a Lamb 116336 vacuum blower motor manufactured by Ametek.

In some embodiments, first container 1200 may be configured with an inner cavity 1202 having a volume of approx. 50 ft³ that provides a fuel pellet storage capacity of approx. 900 kilograms (eg. an amount sufficient for approx. 1 months' use) and second container 1300 may be configured with an inner cavity 1399 having a volume having a volume of approx. 3 ft³ that provides a fuel pellet storage capacity of approx. 50 kilograms (eg. an amount sufficient for 1-3 days' use). However, as indicated above, first container 1200 may be significantly larger in fuel pellet storage volume than second container 1300.

System 1100 is therefore suited for transferring a plurality of fuel pellets from a location external to building 1150 to a location in an interior of the building. In operation, an operator causes first container 1200 to receive and hold a first volume of fuel pellets 1232. With reference to FIG. 10, in one example a first volume is delivered to first container 1200 by a truck 1600. The truck 1600 may have an on-board vacuum generating unit 1602 and a pellet reservoir 1604 containing a supply of pellets. An operator may connect a vacuum conduit 1606 in communication with the vacuum unit 1602 to fitting 1215b of third opening 1213b of first container 1200 and a conduit 1608 in pellet communication with pellet reservoir 1604 to fitting 1215b of second opening 1213a of first container 1200. The vacuum conduit 1606 is in communication with the vacuum generating unit 1602 on the truck 1604 in order to generate an air pressure within inner cavity 1202 of first container 1200 that is lower than the air pressure within the pellet reservoir 1604 of the truck and sufficient to cause fuel pellets held in the pellet reservoir 1604 to be communicated from the pellet reservoir 1604 to first container 1200 through conduit 1608.

In another example, a volume of pellets is delivered to first container 1200 through opening 1205 from sacks or bags.

Once first container 1200 is holding volume 1232 for storage, an operator may selectively operate pneumatic apparatus 1120 through a switch located on the exterior second container 1300 (not shown), or other activation device, to generate first air pressure within enclosed second container 1300 that is lower than a second air pressure in first container 1200 and sufficient to cause fuel pellets held in first container 1200 to be communicated from first container 1200 to second container 1300. The air pressure difference created by pneumatic apparatus 1120 thereby creates an air flow sufficient to transfer fuel pellets held in first container 1200 to second container 1300 mounted at a location in an interior of building 1150. Transfer of fuel pellets 1232 to second container 1300 may continue until the operator deactivates pneumatic apparatus 1120, and/or until second container 1300 is full of fuel pellets 1232.

Once second container 1200 is holding a volume of fuel pellets 1232, an operator may move trapdoor 1304 on second container 1300 from a closed position to an open position through operation of handle 1306 to communicate fuel pellets from second container 1200 to movable third container 1504. In one embodiment, fuel pellets 1232 held in second container 1200 are communicated to third container 1504 by gravitational force.

Of course, the above-described embodiments are intended to be illustrative only and in no way limiting. The described embodiments are susceptible to many modifications of form, arrangement of parts, details, and order of operation. The invention is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. A system for transferring a plurality of fuel pellets comprising:
   a first container positioned at a location remote from a building and configured to hold a first volume of a plurality of fuel pellets;
   an enclosed second container positioned proximate a wall portion of the building and configured to hold a second volume of a plurality of fuel pellets, said second container being in fuel pellet communication with said first container to permit the transfer of fuel pellets from said first container to said second container, and said second container also being in fuel pellet communication with a location in an interior of said building to permit the transfer of fuel pellets from said second container to said interior of said building; and
   an apparatus operable for generating an air pressure differential between said first container and said second container, such that the air pressure within said second container is substantially less than the air pressure in said first container and sufficient to cause fuel pellets held in said first container to be communicated from said first container to said second container.

2. The system of claim 1, wherein said air pressure differential generates an air flow which create forces acting upon fuel pellets in said first container to cause said fuel pellets in said first container to move from the first container through a conduit into the second container.

3. The system of claim 1, wherein said apparatus is operable to reduce said air pressure within said second container such that the air pressure within said second container is substantially less than atmospheric air pressure.

4. The system of claim 1, wherein said second container has a substantially sealed inner cavity.

5. The system of claim 1, wherein said first container has a narrowing shaped bottom surface.

6. The system of claim 1, wherein said apparatus is configured to selectively generate said air pressure differential, thereby selectively communicating fuel pellets held in said first container to said second container.

7. The system of claim 1, wherein said second container is mounted to an exterior wall of the building.

8. The system of claim 1, wherein said apparatus is a vacuum having a suction end connected, by a second conduit, to a top portion of said second container for generating said air pressure differential.

9. The system of claim 1, wherein said fuel pellets are transferred from said second container to said interior of said building through said conduit at least in part by gravity.

10. The system of claim 1, further comprising a third container positioned proximate said location in said interior of said building for receiving fuel pellets from said second container.

11. The system of claim 1, further comprising a trapdoor mounted at said location in said interior of said building, said trapdoor movable between an open position and a closed position, wherein the open position permits the transfer of fuel pellets from said second container to said interior of said building and the closed position seals an opening at said location in said interior of said building.

12. The system of claim 1, further comprising a valve mechanism mounted at said location in said interior of said building, said valve mechanism operable to move between an open position and a closed position, wherein the open position permits the transfer of fuel pellets from said second container to said interior of said building and the closed position seals an opening at said location in said interior of said building.

13. A method for transferring a plurality of fuel pellets comprising:
- holding in a first container a first volume of a plurality of fuel pellets, said first container being positioned at a location remote from a building and being in fuel pellet communication with an enclosed second container to permit the transfer of fuel pellets from said first container to said second container, and said second container being positioned proximate a wall portion of the building; and
- selectively operating a pneumatic apparatus to generate an air pressure differential between said first container and said second container, such that the air pressure within said second container is substantially less than the air pressure in said first container and sufficient to cause fuel pellets held in said first container to be communicated from said first container to said second container, thereby transferring fuel pellets to said second container.

14. A system for transferring a plurality of fuel pellets from a location external to a building, through an exterior wall of said building, to a location within said building, said system comprising:
- (i) a first container positioned at a location external to said building and configured to hold a first volume of a plurality of fuel pellets in a first inner cavity;
- (ii) a second enclosed container positioned at a location in an interior of said building and configured to hold a second volume of a plurality of fuel pellets in a second inner cavity,
- (iii) a first conduit providing fuel pellet communication from an inner cavity of said first container via said first conduit to said inner cavity of said second container to enable the transfer of fuel pellets from said first container to said second container; and
- (iv) a pneumatic apparatus positioned at a location external of said building;
- (v) a second conduit extending from said second container said through said exterior wall of said building to said pneumatic apparatus and providing air flow communication from said second inner cavity through said second conduit;
- said pneumatic apparatus being operable for selectively generating an air pressure differential between said first inner cavity and said second inner cavity, such that when operated, a first air pressure within said second inner cavity is less than a second air pressure in said first inner cavity, said air pressure differential developed by said pneumatic apparatus by air flow though said second conduit, being sufficient to cause fuel pellets held in said first container to be communicated with air flow from said first container through said first conduit to said second container.

15. The system of claim 14, wherein said air pressure differential generates an air flow through said first conduit from said first container to said second container which creates forces acting upon fuel pellets in said first inner cavity to cause said fuel pellets in said first container to move from the first container through said first conduit which ends at, and flows into, an upper region of the second inner cavity.

16. The system of claim 14, wherein an outlet of said first conduit in said second inner cavity is angled downwards.

17. The system of claim 14, wherein the inlet of said second conduit in said second inner cavity is angled upwards.

18. A method for transferring a plurality of fuel pellets comprising:
- holding in a first container a first volume of a plurality of fuel pellets, said first container being positioned at a location external of a building and being in fuel pellet communication with an enclosed second container, said second container positioned in a location in an interior of said building, said first container and second container operable to permit the transfer of fuel pellets from said first container through a first conduit to said second container, and said second container being positioned proximate a location external of said building; and
- selectively operating a pneumatic apparatus, said apparatus positioned at a location on the exterior of said building and interconnected for air flow transmission by a second conduit to said second container, to generate an air pressure differential between said first container and said second container, such that the air pressure within said second container is substantially less than the air pressure in said first container and sufficient to cause fuel pellets held in said first container to be communicated from said first container to said second container, thereby transferring fuel pellets to said second container.

19. A system for transferring a plurality of fuel pellets from a location external to a building, through an exterior wall of said building, to a location within said building, said system comprising:
- (i) a first enclosed container positioned at a location external to said building, said first enclosed container configured to hold a first volume of a plurality of fuel pellets in a first inner cavity;
- (ii) a second enclosed container positioned at a location in an interior of said building and proximate said exterior wall, said second enclosed container configured to hold a second volume of a plurality of fuel pellets in a second inner cavity,
- (iii) a first conduit extending through said exterior wall and providing fuel pellet communication from said first inner cavity of said first enclosed container through said exterior wall to said second inner cavity of said second enclosed container to enable the transfer of fuel pellets from said first container to said second container, said first conduit having an inlet within said first inner cavity of said first enclosed container; and
- (iv) a pneumatic apparatus positioned proximate said exterior wall;
- (v) a second conduit extending from said second inner cavity of said second enclosed container to said pneumatic apparatus and providing air flow communication from said second inner cavity of said second enclosed container through said second conduit;

said pneumatic apparatus being operable for selectively generating an air pressure differential between said first inner cavity of said first enclosed container and said second inner cavity of said second enclosed container, such that when operated, a first air pressure within said second inner cavity is less than a second air pressure in said first inner cavity, said air pressure differential developed by said pneumatic apparatus by air flow though said second conduit, being sufficient to cause fuel pellets held in said first inner cavity of said first enclosed container to be communicated with air flow from said first enclosed container through said exterior wall via said first conduit to said second inner cavity of said second enclosed container.

20. The system of claim 19, wherein said second enclosed container comprises a door movable between an open position and a closed position, wherein the open position permits the transfer of fuel pellets from said second enclosed container through an opening and the closed position which prevents the transfer of fuel pellets from said second enclosed container through the opening and air seals the opening.

21. The system of claim 19, wherein said first enclosed container has an interior fuel pellet storage volume that is substantially larger than an interior fuel pellet storage volume of the second enclosed container.

22. The system of claim 19, wherein the first enclosed container is positioned 10 feet or less from said exterior wall.

23. The system of claim 19, wherein the second enclosed container is fixedly positioned at said location in said interior of said building.

* * * * *